US012810767B2

(12) United States Patent
Song

(10) Patent No.: US 12,810,767 B2
(45) Date of Patent: Nov. 24, 2026

(54) DISPLAY DEVICE, DRIVING METHOD THEREOF, AND HEAD- MOUNTED DISPLAY DEVICE INCLUDING THE DISPLAY DEVICE

(71) Applicant: Samsung Display Co., Ltd., Yongin-Si (KR)

(72) Inventor: In BoK Song, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 176 days.

(21) Appl. No.: 18/756,137

(22) Filed: Jun. 27, 2024

(65) Prior Publication Data

US 2025/0118244 A1 Apr. 10, 2025

(30) Foreign Application Priority Data

Oct. 5, 2023 (KR) ........................ 10-2023-0132131

(51) Int. Cl.

| | |
|---|---|
| ***G06T 11/00*** | (2026.01) |
| ***G06T 11/10*** | (2026.01) |
| ***G09G 3/00*** | (2006.01) |
| ***G09G 3/20*** | (2006.01) |
| ***G09G 3/3291*** | (2016.01) |
| *G09G 3/3233* | (2016.01) |

(52) U.S. Cl.

CPC ............ *G09G 3/2096* (2013.01); *G06T 11/10* (2026.01); *G09G 3/001* (2013.01); *G09G 3/006* (2013.01); *G09G 3/3291* (2013.01); *G09G 3/3233* (2013.01); *G09G 2300/0819* (2013.01); *G09G 2300/0852* (2013.01); *G09G 2300/0861* (2013.01); *G09G 2320/041* (2013.01); *G09G 2330/12* (2013.01)

(58) Field of Classification Search

None

See application file for complete search history.

(56) References Cited

U.S. PATENT DOCUMENTS

2011/0211127 A1* 9/2011 Kelvin ..................... H04N 9/68 348/E5.119
2012/0139977 A1* 6/2012 Lee ...................... G09G 3/3208 345/691

(Continued)

FOREIGN PATENT DOCUMENTS

JP 2008181007 A 8/2008
KR 10-20140092684 A 7/2014

*Primary Examiner* — Sultana M Zalalee

(74) *Attorney, Agent, or Firm* — Innovation Counsel LLP

(57) ABSTRACT

A display device is disclosed that includes: a display panel including a display area and a non-display area at the periphery of the display area, wherein a plurality of data lines and a plurality of pixels connected to the plurality of data lines are disposed in the display area; a temperature sensor disposed in the non-display area of the display panel, the temperature sensor configured to output temperature data corresponding to a sensed temperature; and a data driver for converting the temperature data into digital-type temperature data, synthesizing a background image, based on the digital-type temperature data, and converting synthesized image data obtained by synthesizing the background image into a data voltage, thereby outputting the data voltage to the plurality of data lines.

19 Claims, 20 Drawing Sheets

(56) References Cited

U.S. PATENT DOCUMENTS

| | | | | |
|---|---|---|---|---|
| 2012/0257018 | A1* | 10/2012 | Shigemura | G02B 30/27 348/46 |
| 2015/0253702 | A1* | 9/2015 | Morishita | G03G 15/2039 399/69 |
| 2016/0005156 | A1* | 1/2016 | Wang | G06T 7/001 348/94 |
| 2017/0124959 | A1* | 5/2017 | Kim | G09G 3/3225 |
| 2017/0178565 | A1* | 6/2017 | Fujimaki | G09G 3/003 |
| 2018/0090062 | A1* | 3/2018 | Nakamura | G09G 3/3233 |
| 2019/0392777 | A1* | 12/2019 | Kim | G09G 3/3688 |
| 2021/0201796 | A1* | 7/2021 | Park | G09G 3/3233 |
| 2022/0147124 | A1* | 5/2022 | Choi | G06F 1/203 |
| 2023/0071294 | A1* | 3/2023 | Takahata | H04N 5/66 |
| 2023/0386390 | A1* | 11/2023 | Park | G09G 3/3233 |

* cited by examiner

DISPLAY DEVICE, DRIVING METHOD THEREOF, AND HEAD- MOUNTED DISPLAY DEVICE INCLUDING THE DISPLAY DEVICE

CROSS-REFERENCE TO RELATED APPLICATION

The present application claims priority under 35 U.S.C. § 119(a) to Korean patent application No. 10-2023-0132131, filed on Oct. 5, 2023, in the Korean Intellectual Property Office, the entire disclosure of which is incorporated herein by reference.

BACKGROUND

1. Technical Field

The present disclosure relates to a display device, a driving method thereof, and a head-mounted display device including the display device.

2. Related Art

With the development of information technologies, the importance of display devices which are connection mediums between users and information has increased. Accordingly, display devices such as liquid crystal display devices, organic light emitting display devices, and inorganic light emitting display devices are increasingly used.

A temperature sensor may be disposed in a display device. For example, a controller may adjust a luminance or the like of an image displayed in the display device, based on temperature data received from the temperature sensor.

However, when a connection between the temperature sensor and the controller is deteriorated, a user may have difficulty in recognizing heat generation (or overheating) of the display device.

SUMMARY

Embodiments may provide a display device, a driving method thereof, and a head-mounted display device including the display device, in which a user can visually recognize heat generation even when connection between a temperature sensor and a controller is deteriorated.

An embodiment of a display device includes: a display panel including a display area and a non-display area at the periphery of the display area, wherein a plurality of data lines and a plurality of pixels connected to the plurality of data lines are disposed in the display area; a temperature sensor disposed in the non-display area of the display panel, the temperature sensor configured to output temperature data corresponding to a sensed temperature; and a data driver configured to convert the temperature data into digital-type temperature data, synthesize a background image, based on the digital-type temperature data, and convert synthesized image data obtained by synthesizing the background image into a data voltage, thereby outputting the data voltage to the plurality of data lines.

The data driver may be connected to a panel line disposed in the non-display area of the display panel. The temperature sensor may output the temperature data through the panel line.

The data driver may include: an analog-digital converter configured to convert the temperature data into the digital-type temperature data; a memory configured to store the digital-type temperature data; a temperature image generator configured to store the background image therein, and generate synthesized image data obtained by synthesizing the background image with received image data, based on a result obtained by reading the digital-type temperature data stored in the memory; and an output circuit configured to convert the synthesized image data into a data voltage, thereby outputting the data voltage to the plurality of data lines.

The display device may further include a controller configured to receive the digital-type temperature data and input image data, generate the image data by correcting the input image data, based on the digital-type temperature data, and output the image data and a data control signal.

The data driver may further include: a first interface configured to receive the data control signal, and output the digital-type temperature data; and a second interface configured to receive the image data.

The first interface may be an Inter-Integrated Circuit (I2C) interface, and the second interface may be a Low Voltage Differential Signaling (LVDS) interface.

A plurality of temperature sensors including the temperature sensor may be disposed in the non-display area of the display panel. The plurality of temperature sensors may be disposed corresponding to a plurality of corner areas in the display area.

The analog-digital converter may sequentially sense the plurality of temperature sensors.

A plurality of digital-type temperature data generated by sequentially sensing the plurality of temperature sensors may be stored in the memory.

The temperature image generator may generate the synthesized image data by synthesizing the background image with the image data such that the background image is displayed in an area decided to be at a high temperature, based on the plurality of digital-type temperature data.

The background image may be displayed in at least one of the plurality of corner areas of the display area.

The background image may be displayed in an edge area in which two adjacent corner area among the plurality of corner area of the display area are connected to each other.

The temperature image generator may differently gradation-process the background image, based on a value of the digital-type temperature data.

An embodiment of a method of driving a display device includes: receiving temperature data from a temperature sensor disposed in a non-display area of a display panel; converting the received temperature data into digital-type temperature data; storing the converted digital-type temperature data in a memory; reading the digital-type temperature data stored in the memory; synthesizing a pre-stored background image with input image data, based on the read digital-type temperature data; converting synthesized image data obtained by synthesizing the background image with the image data into a data voltage corresponding thereto; and outputting the data voltage to a display area of the display panel.

An embodiment of a head-mounted display device includes: a processor configured to output first input image data and second input image data; a first display device including a first display panel, the first display device configured to synthesize a stored background image with first image data corresponding to the first input image data, based on temperature data sensed in the first display panel, thereby displaying a first synthesized image to a first eye of a user; and a second display device including a second display panel, the second display device configured to synthesize a stored background image with second image data corresponding to the second input image data, based on temperature data sensed in the second display panel, thereby displaying a second synthesized image to a second eye of the user.

The first display panel may include a display area and a non-display area at the periphery of the display area, and a plurality of data lines and a plurality of pixels connected to the plurality of data lines may be disposed in the display area. The first display device may include: a temperature sensor disposed in the non-display area of the first display panel, the temperature sensor outputting the temperature data corresponding to a sensed temperature; and a data driver configured to convert the temperature data into digital-type temperature data, synthesize a background image, based on the digital-type temperature data, and convert synthesized image data obtained by synthesizing the background image into a data voltage, thereby outputting the data voltage to the plurality of data lines.

The data driver may include: an analog-digital converter configured to convert the temperature data into the digital-type temperature data; a memory configured to store the digital-type temperature data; a temperature image generator configured to store the background image therein, and generate synthesized image data obtained by synthesizing the background image with the received first image data, based on a result obtained by reading the digital-type temperature data stored in the memory; and an output circuit configured to convert the synthesized image data into a data voltage, thereby outputting the data voltage to the plurality of data lines.

The first display device may further include a controller configured to receive the digital-type temperature data and the first input image data, generate the first image data by correcting the first input image data, based on the digital-type temperature data, and output the first image data and a data control signal.

The data driver may further include: a first interface configured to receive the data control signal, and output the digital-type temperature data; and a second interface configured to receive the first image data.

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
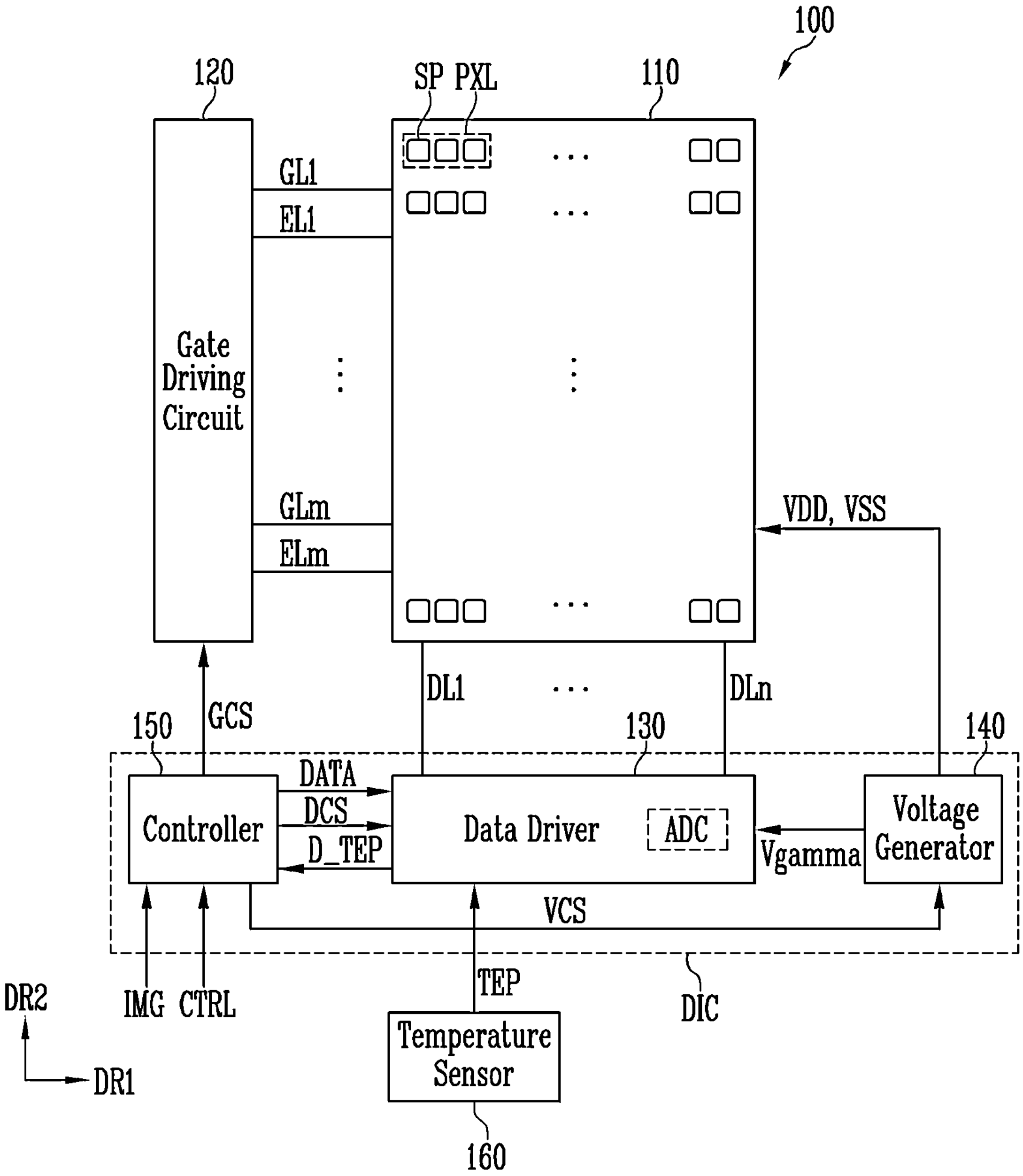
FIG. 1 is a system block diagram of a display device in accordance with embodiments of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially' is omitted.

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

The terms "under," "beneath," "on," "above," and the like are used to describe a relationship between components illustrated in a drawing. The terms are relative and are described with reference to a direction indicated in the drawing.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically.

It will be further understood that the terms "comprises" and "includes" (as well as their variations such as "comprising") when used in this specification, specify the presence of stated features, integers, steps, operations, elements, or components, but do not preclude the presence or addition of one or more other features, integers, steps, operations, elements, components, or groups thereof.

Hereinafter, exemplary embodiments of the present disclosure will be described in detail with reference to the accompanying drawings.

FIG. 1 is a system block diagram of a display device 100 in accordance with embodiments of the present disclosure.

Referring to FIG. 1, the display device 100 in accordance with the embodiments of the present disclosure may include a display panel 110, a gate driving circuit 120, a data driver 130, a voltage generator 140, a controller 150, a temperature sensor 160, and the like.

The display panel 110 may include a plurality of sub-pixels SP. First to mth gate lines GL1 to GLm (m is an integer of 2 or more) connected to the plurality of sub-pixels SP may be disposed in the display panel 110. First to nth data lines DL1 to DLn (n is an integer of 2 or more) connected to the plurality of sub-pixels SP may be disposed in the display panel 110.

The plurality of sub-pixels SP may be connected (e.g., electrically connected) to the gate driving circuit 120 through the first to mth gate lines GL1 to GLm. The plurality of sub-pixels SP may be connected (e.g., electrically connected) to the data driver 130 through the first to nth data lines DL1 to DLn.

Each of the plurality of sub-pixels SP may include at least one light emitting element configured to generate light. Each of the plurality of sub-pixels SP may generate light of a color (e.g., a specific color or a specific wavelength band), such as red, green, blue, cyan, magenta or yellow. Two or more sub-pixels among the plurality of sub-pixels SP may constitute one pixel PXL. For example, three sub-pixels SP may constitute one pixel PXL as shown in FIG. 1.

The gate driving circuit 120 may be connected (e.g., electrically connected) to the plurality of sub-pixels SP (e.g., the plurality of sub-pixels SP entirely arranged in a first direction DR1) through the first to mth gate lines GL1 to GLm. The first direction DR1 may be, for example, a direction crossing the display panel 110 from one side (e.g., a left side) to the other side (e.g., a right side) of the display panel 110. The first direction DR1 may be, for example, a row direction.

The gate driving circuit 120 may output gate signals (e.g., gate signals having a turn-on level or a turn-off level) to the first to mth gate lines GL1 to GLm in response to a gate control signal GCS. In embodiments, the gate control signal GCS may include a start signal indicating a start of each frame, a horizontal synchronization signal for outputting gate signals in synchronization with timings at which data voltages are applied, and the like.

In embodiments, first to mth emission control lines EL1 to ELm connected to the plurality of sub-pixels SP may be further disposed in the display panel 110. The first to mth emission control lines EL1 to ELm may be disposed in the display panel 110 while extending in the row direction. The plurality of sub-pixels SP may be connected (e.g., electrically connected) to the first to mth emission control lines EL1 to ELm. In the above embodiment, the gate driving circuit 120 may include an emission control driver configured to control the first to mth emission control lines EL1 to ELm. The emission control driver may operate under the control of the controller 150.

The gate driving circuit 120 may be disposed at one side of the display panel 110. However, embodiments of the present disclosure are not limited thereto. For example, the gate driving circuit 120 may be divided into two or more driving circuits which are physically or logically divided, and these driving circuits may be disposed at one side of the display panel 110 and the other side of the display panel 110 (e.g., the other side of the display panel 110, which faces the one side of the display panel 110). As such, in some embodiments, the gate driving circuit 120 may be disposed in various forms in the display panel 110 or at the periphery of the display panel 110.

The data driver 130 may be connected (e.g., electrically connected) to the plurality of sub-pixels SP (e.g., the plurality of sub-pixels SP entirely arranged in a second direction DR2) through the first to nth data lines DL1 to DLn. The second direction DR2 may be, for example, a direction crossing the display panel 110 from one side (e.g., a lower side) of the display panel 110 to the other side (e.g., an upper side) of the display panel 110. The second direction DR2 may be, for example, a column direction.

The data driver 130 may receive image data DATA and a data control signal DCS from the controller 150. The data driver 130 may operate in response to the data control signal DCS. In embodiments, the data control signal DCS may include a source start pulse, a source shift clock, a source output enable signal, and the like.

The data driver 130 may apply data signals having grayscale voltages corresponding to the image data DATA to the first to nth data lines DL1 to DLn by using voltages (e.g., gamma voltages Vgamma) from the voltage generator 140. When a gate signal (e.g., a gate signal having the turn-on level) is applied to each of the first to mth gate lines GL1 to GLm, data voltages corresponding to the image data DATA may be applied to the data line DL1 to DLm. Each of the plurality of sub-pixels SP may receive a data voltage applied at a corresponding timing in response to the gate signal (e.g., the gate signal having the turn-on level). Each of the plurality of sub-pixels SP may generate light corresponding to the received data voltage. Accordingly, an image may be displayed in on the display panel 110.

In embodiments, each of the gate driving circuit 120 and the data driver 130 may include complementary metal-oxide semiconductor (CMOS) circuit elements.

The voltage generator 140 may operate in response to a voltage control signal VCS from the controller 150. The voltage generator 140 may be configured to generate a plurality of voltages and provide the generated voltages to components of the display device 100. For example, the voltage generator 140 may receive an input voltage from the outside of the display device 100. The voltage generator 140 may adjust (e.g., decrease) a level of the received voltage, and regulate the voltage having the adjusted level. The voltage generator 140 may be configured to generate a plurality of voltages.

The voltage generator 140 may generate, for example, a first power voltage VDD, a second power voltage VSS, a gamma voltage Vgamma, and the like. The generated first and second power voltages VDD and VSS may be applied (e.g., commonly applied) to the plurality of sub-pixels SP. The first power voltage VDD may have a relatively high voltage level. The second power voltage VSS may have a voltage level lower than the voltage level of the first power voltage VDD. The generated gamma voltage Vgamma may be provided to the data driver 130. In other embodiments, the first power voltage VDD or the second power voltage VSS may be provided by an external device of the display device 100 (e.g., a Power Management Integrated Circuit (PMIC)).

In some embodiments, the voltage generator 140 may further generate another voltage. For example, the voltage generator 140 may generate an initialization voltage applied (e.g., commonly applied) to the plurality of sub-pixels SP. For example, in a sensing operation for sensing electrical characteristics of transistors or a light emitting element(s) of the plurality of sub-pixels SP, a predetermined reference voltage may be applied to the first to nth data lines DL1 to DLn, and the voltage generator 140 may generate the reference voltage.

The controller 150 may be configured to control overall operations of the display device 100. The controller 150 may receive, from the outside, input image data IMG and a control signal CTRL for controlling display thereof. The controller 150 may provide the gate control signal GCS, the data control signal DCS, the voltage control signal VCS, and the like in response to the received control signal CTRL.

The controller 150 may convert the input image data IMG to be suitable for the display device 100 or the display panel 110, thereby outputting the image data DATA. In embodiments, the controller 150 may align the input image data IMG to be suitable for the sub-pixels SP in units of rows, thereby outputting the image data DATA.

Two or more components among the data driver 130, the voltage generator 140, and the controller 150 may be mounted on one integrated circuit. As shown in FIG. 1, the data driver 130, the voltage generator 140, and the controller 150 may be included in a driver integrated circuit DIC. The data driver 130, the voltage generator 140, and the controller 150 may be components functionally divided in one driver integrated circuit DIC. In other embodiments, at least one of the data driver 130, the voltage generator 140, and the controller 150 may be mounted on the driver integrated circuit DIC, and another of the data driver 130, the voltage generator 140, and the controller 150 may be provided to be mounted on an integrated circuit different from the driver integrated circuit DIC.

The temperature sensor 160 may be configured to sense a temperature (e.g., a temperature at the periphery thereof) and generate temperature data TEP indicating the sensed temperature. In some embodiments, the temperature sensor 160 may be disposed in the display panel 110. In some embodiments, the temperature sensor 160 may be disposed to be adjacent to the display panel 110 or the driver integrated circuit DIC. In some embodiments, the display device 100 may include two or more temperature sensors 160.

In embodiments of the present disclosure, the data driver 130 may receive temperature data TEP from the temperature sensor 160. The data driver 130 may include an analog-digital converter ADC configured to convert the temperature data TEP input from the temperature sensor 160 into a digital-type temperature data D_TEP. However, embodiments of the present disclosure are not limited thereto, and the analog-digital converter ADC may be located outside the data driver 130.

The analog-digital converter ADC may convert the input temperature data TEP into a digital-type temperature data D_TEP corresponding thereto. The digital-type temperature data D_TEP may be output from the data driver 130 to be input to the controller 150.

The controller 150 may control various operations of the display device 100 in response to the digital-type temperature data D_TEP. In embodiments, the controller 150 may adjust a luminance of an image output from the display panel 110 in response to the digital-type temperature data D_TEP. For example, the controller 150 may generate image data DATA by correcting input image data IMG in response to the digital-type temperature data D_TEP. For example, the controller 150 may adjust at least one of the data voltages, the first power voltage VDD, and the second power voltage VSS, which are input to the display panel 110, by controlling components such as the data driver 130 or the voltage generator 140.

Figure 2:
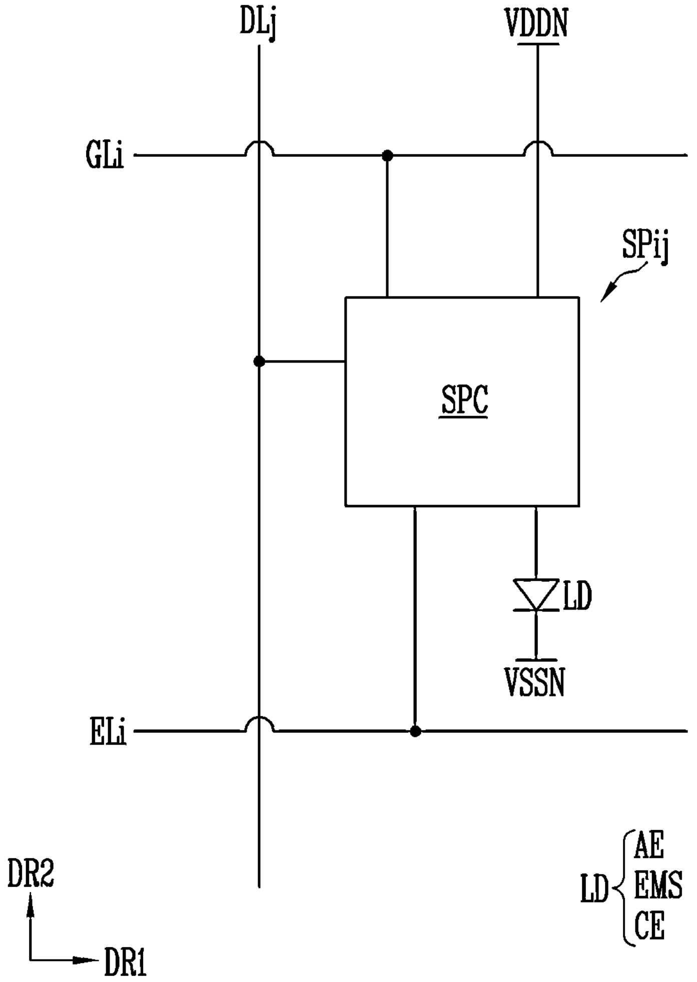
FIG. 2 is a block diagram illustrating an embodiment of a sub-pixel shown in FIG. 1.

FIG. 2 is a block diagram illustrating an embodiment of any one of the sub-pixels SP shown in FIG. 1.

In FIG. 2, a sub-pixel SPij disposed on an ith row (i is an integer greater than 1 and less than or equal to m) and a jth column (j is an integer greater than 1 and less than or equal to n) among the plurality of sub-pixels SP shown in FIG. 1 is exemplarily illustrated.

Referring to FIG. 2, the sub-pixel SPij may include a sub-pixel circuit SPC and a light emitting element LD.

The light emitting element LD may be connected (e.g., electrically connected) between a first power voltage node VDDN and a second power voltage node VSSN. The first power voltage node VDDN may be a node to which the first power voltage VDD shown in FIG. 1 is applied. The second power voltage node VSSN may be a node to which the second power voltage VSS shown in FIG. 1 is applied.

The light emitting element LD may include a first electrode, a light emitting structure EMS, and a second electrode. The first electrode may be any one of an anode electrode AE and a cathode electrode CE of the light emitting element LD. The second electrode may be the other of the anode electrode AE and the cathode electrode CE of the light emitting element LD. Hereinafter, for convenience of description, a case where the first electrode of the light emitting element LD is the anode electrode AE and the second electrode of the light emitting element LD is the cathode electrode CE is described as an example.

The anode electrode AE of the light emitting element LD may be connected (e.g., electrically connected) to the first power voltage node VDDN through the sub-pixel circuit SPC. The cathode electrode CE of the light emitting element LD may be connected (e.g., electrically connected) to the second power voltage node VSSN. For example, the anode electrode AE of the light emitting element LD may be connected (e.g., electrically connected) to the first power voltage node VDDN through one or more transistors included in the sub-pixel circuit SPC.

The sub-pixel circuit SPC of the sub-pixel SPij may be connected (e.g., electrically connected) to an ith gate line GLi among the first to mth gate lines GL1 to GLm shown in FIG. 1. The sub-pixel circuit SPC of the sub-pixel SPij may be connected (e.g., electrically connected) to an ith emission control line ELi among the first to mth emission control lines EL1 to Elm shown in FIG. 1. The sub-pixel circuit SPC of the sub-pixel SPij may be connected (e.g., electrically connected) to a jth data line DLj among the first to nth data lines DL1 to DLn shown in FIG. 1. The sub-pixel circuit SPC may be configured to control an emission timing or an emission luminance of the light emitting element LD according to (or in response to) signals received through these signal lines.

The sub-pixel circuit SPC may operate in response to a gate signal received through the ith gate line GLi. The sub-pixel SPC may operate in response to an emission control signal received through the ith emission control line ELi.

The sub-pixel circuit SPC may receive a data signal through a jth data line DLj. The sub-pixel circuit SPC may store a voltage of the data voltage (or a voltage corresponding to the data voltage) in response to the gate signal (e.g., the gate signal having the turn-on level) received through the ith gate line GLi. The sub-pixel circuit SPC may adjust a timing at which a current flows through the light emitting element LD in response to the emission control signal (e.g., the emission control having the turn-on level) applied through the ith emission control line ELi. A magnitude of the current flowing through the light emitting element LD may vary according to a voltage stored in the sub-pixel circuit SPC. The light emitting element LD may generate light with a luminance corresponding to the data voltage.

Figure 3:
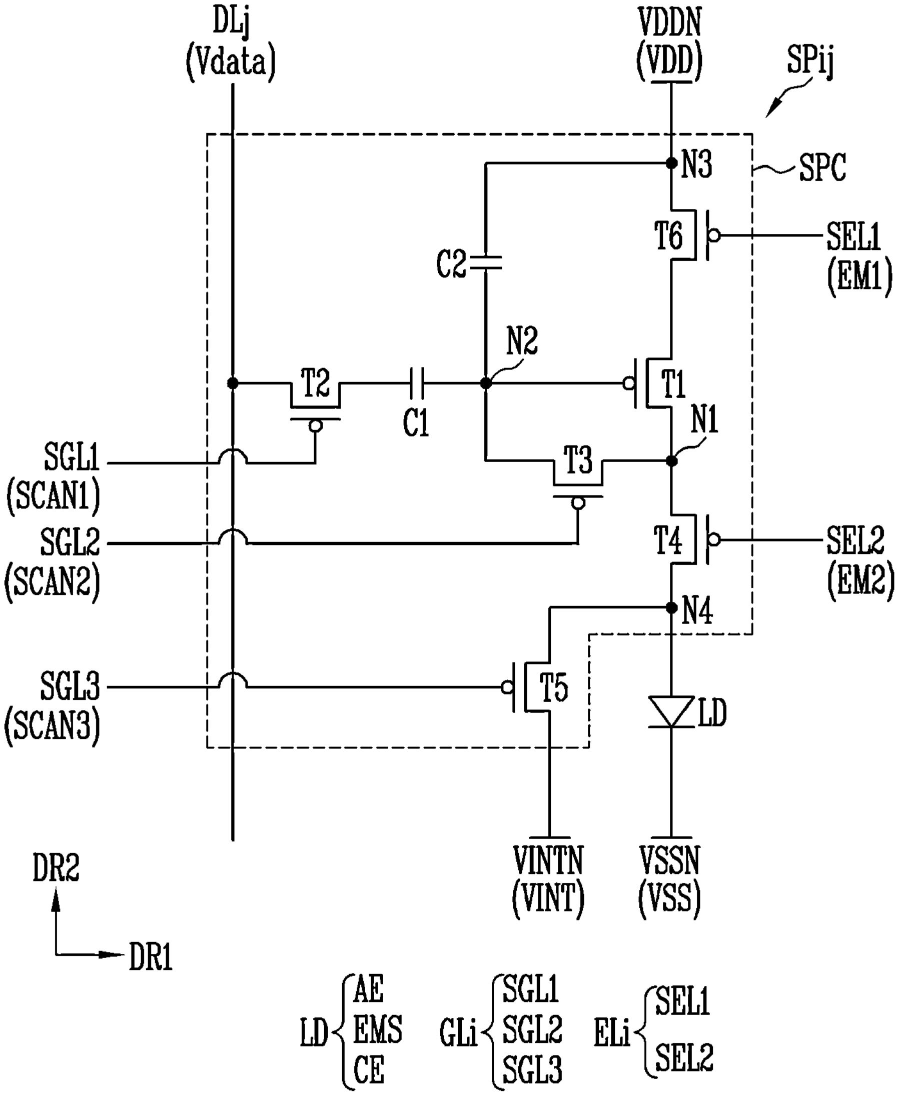
FIG. 3 is an equivalent circuit diagram illustrating an embodiment of the sub-pixel shown in FIG. 2.

FIG. 3 is an equivalent circuit diagram illustrating an embodiment of the sub-pixel SPij shown in FIG. 2.

Referring to FIG. 3, the sub-pixel SPij may include a sub-pixel circuit SPC and a light emitting element LD. The sub-pixel circuit SPC may be connected (e.g., electrically connected) to an ith gate line GLi, an ith emission control line ELi, and a jth data line DLj.

The ith gate line GLi may include two or more sub-gate lines. Referring to FIG. 3, the ith gate line GLi may include a first sub-gate line SGL1, a second sub-gate line SGL2, and a third sub-gate line SGL3.

The ith emission control line ELi may include two or more sub-emission control lines. Referring to FIG. 3, the ith emission control line ELi may include a first sub-emission control line SEL1 and a second sub-emission control line SEL2.

The sub-pixel circuit SPC may include at least two switching elements (e.g., transistors) and at least one storage element (e.g., at least one capacitor). Referring to FIG. 3, the sub-pixel circuit SPC in accordance with the embodiments of the present disclosure may include first to sixth transistors T1 to T6 and first and second capacitors C1 and C2.

The first transistor T1 may be connected between a first power voltage node VDDN and a first node N1. Referring to FIG. 3, the first transistor T1 may be connected between the sixth transistor T6 and the first node N1. A gate of the first transistor T1 may be connected (e.g., electrically connected) to a second node N2. The first transistor T1 may be turned on according to a voltage level pf the second node N2. The magnitude of current (e.g., driving current) flowing through the first transistor T1 may be differently controlled according to the voltage level of the second node N2. The first transistor T1 may be designated as a driving transistor.

The second transistor T2 may be connected between the jth data line DLj and the second node N2. Referring to FIG. 3, the second transistor T2 may be configured to switch electrical connection between the jth data line DLj and the first capacitor C1. A gate of the second transistor T2 may be connected to the first sub-gate line SGL1. The second transistor T2 may be controlled in response to a first gate signal SCAN1 applied to the first sub-gate line SGL1. The second transistor T2 may be turned on in response to the first gate signal SCAN1 having a turn-on level. The second transistor T2 may be designated as a switching transistor.

The third transistor T3 may be configured to switch electrical connection between the first node N1 and the second node N2. A gate of the third transistor T3 may be connected (e.g., electrically connected) to the second sub-gate line SGL2. The third transistor T3 may be controlled in response to a second gate signal SCAN2 applied to the second sub-gate line SGL2. The third transistor T3 may be turned on in response to the second gate signal SCAN2 having the turn-on level.

The fourth transistor T4 may be connected between the first node N1 and an anode electrode AE of the light emitting element LD. Referring to FIG. 3, the fourth transistor T4 may be configured to switch electrical connection between the first node N1 and a fourth node N4. A gate of the fourth transistor T4 may be connected to the second sub-emission control line SEL2. The fourth transistor T4 may be controlled in response to a second emission signal EM2 applied to a second emission line SEL2. The fourth transistor T4 may be turned on in response to the second emission signal EM2 having the turn-on level.

The fifth transistor T5 may be connected between the anode electrode AE of the light emitting element LD and an initialization voltage node VINTN. Referring to FIG. 3, the fifth transistor T5 may be configured to switch electrical connection between the fourth node N4 and the initialization voltage node VINTN. The initialization voltage node VINTN may be configured to transfer an initialization voltage VINT. In embodiments, the initialization voltage VINT may be provided by the voltage generator 140 shown in FIG. 1. In other embodiments, the initialization voltage VINT may be provided by an external device (e.g., a Power Management Integrated Circuit (PMIC)) distinguished from the display device 100. A gate of the fifth transistor T5 may be connected (e.g., electrically connected) to the third sub-gate line SGL3. The fifth transistor T5 may be controlled in response to the third gate signal SCAN3 applied to the third sub-gate line SGL3. The fifth transistor T5 may be turned on in response to the third gate signal SCAN3 having the turn-on level.

The sixth transistor T6 may be connected between the first power voltage node VDDN and the first transistor T1. Referring to FIG. 3, the sixth transistor T6 may be configured to switch electrical connection between a third node N3 and the first transistor T1. A gate of the sixth transistor T6 may be connected to the first sub-emission control line SEL1. The sixth transistor T6 may be controlled in response to a first emission control signal EM1 applied to the first sub-emission control line SEL1. The sixth transistor T6 may be turned on in response to the first emission control signal EM1 having the turn-on level.

The first capacitor C1 may be connected between the second transistor T2 and the second node N2. The first capacitor C1 may include one electrode connected to the second transistor T2 and the other electrode connected to the second node N2.

The second capacitor C2 may be connected between the third node N3 and the second node N2. The second capacitor C2 may include one electrode connected to the second node N2 and the other electrode connected to the third node N3.

Each of the first capacitor C1 and the second capacitor C2 may not be any parasitic capacitor. For example, each of the first capacitor C1 and the second capacitor C2 may be an intentionally formed capacitor.

As described above, the sub-pixel circuit SPC may include the first to sixth transistors T1 to T6 and the first and second capacitors C1 and C2. However, embodiments of the present disclosure are not limited thereto. The sub-pixel circuit SPC may be implemented as any one of various types of circuits each including a plurality of transistors and one or more capacitors. For example, the sub-pixel circuit SPC may include two transistors and one capacitor. In accordance with embodiments of the sub-pixel circuit SPC, the number of sub-gate lines SGL included in the ith gate line GLi may vary. In some embodiments, the number of sub-emission control lines SEL included in the ith emission control line ELi may vary.

Referring to FIG. 3, each of the first to sixth transistors T1 to T6 may be a P-type transistor (e.g., a transistor including a P-type semiconductor). At least one of the first to sixth transistors T1 to T6 may be a Metal Oxide Silicon Field Effect Transistor (MOSEFT). However, embodiments of the present disclosure are not limited thereto. For example, at least one of the first to sixth transistors T1 to T6 may be replaced with an N-type transistor (e.g., a transistor including an N-type semiconductor).

In embodiments, the first to sixth transistors T1 to T6 may include an amorphous silicon semiconductor, a polycrystalline silicon semiconductor, an oxide semiconductor, and the like.

The light emitting element LD may include the anode electrode AE, a cathode electrode CE, and a light emitting structure EMS. The light emitting structure EMS may be disposed between the anode electrode AE and the cathode electrode CE. A data voltage Vdata written to the sub-pixel SPij through a data line DLj (e.g., the jth data line DLj) may be reflected as a voltage of the second node N2 by a coupling phenomenon of the first capacitor C1. When the first and second emission control signals EM1 and EM2 are enabled to the turn-on level (e.g., a low level), the fourth and sixth transistors T4 and T6 may be turned on. The first transistor T1 may be turned on according to the voltage of the second node N2, and a current (e.g., a driving current) having a magnitude corresponding to the voltage of the second node N2 may flow through the first transistor T1. Accordingly, a current may flow from the first power voltage node VDDN to a second power voltage node VSSN. The light emitting element LD may emit light with a luminance corresponding to the magnitude of current, which may be referred to as a driving current, flowing therethrough.

Figure 4:
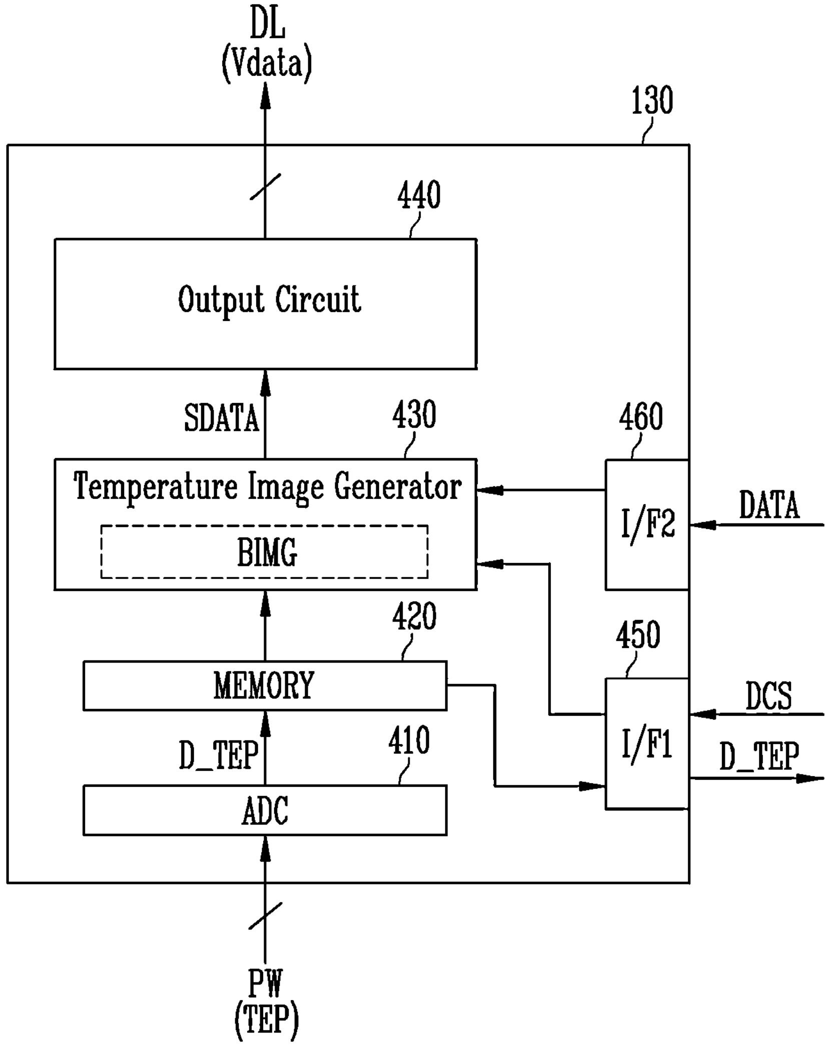
FIG. 4 is a system block diagram of a data driver in accordance with embodiments of the present disclosure.

FIG. 4 is a system block diagram of a data driver 130 in accordance with embodiments of the present disclosure.

Referring to FIG. 4, the data driver 130 in accordance with the embodiments of the present disclosure may include an analog-digital converter (ADC) 410, a memory 420, a temperature image generator 430, an output circuit 440, a first interface (I/F1) 450, a second interface (I/F2) 460, and the like.

The ADC 410 may be configured to convert temperature data TEP into digital-type temperature data D_TEP corresponding thereto. The temperature data TEP may be input to the ADC 410 through a panel line PW (or a plurality of panel lines PW). In an embodiment in which the plurality of panel lines PW are connected (e.g., electrically connected) to the ADC 410, a multiplexer (e.g., an N:1 multiplexer) may be further disposed between the ADC 410 and the plurality of panel lines PW. The temperature data TEP may be, for example, an analog voltage.

The memory 420 may store the digital-type temperature data D_TEP output from the ADC 410. The memory 420 may be implemented as, for example, a register. In the embodiment in which the plurality of panel lines PW are connected (e.g., electrically connected) to the ADC 410, a plurality of digital-type temperature data D_TEP may be stored in the memory 420.

The temperature image generator 430 may receive the digital-type temperature data D_TEP, image data DATA, and a data control signal DCS. The temperature image generator 430 may fetch a value of the digital-type temperature data D_TEP with reference to the memory 420. The temperature image generator 430 may synthesize a pre-stored background image BIMG with the image data DATA with reference to the fetched digital-type temperature data D_TEP. For example, the temperature image generator 430 may display the pre-stored background image BIMG (or a background image BIMG synthesized with the image data DATA) at the periphery of an area in which a temperature is high, which is indicated by the digital-type temperature data D_TEP. For example, the temperature image generator 430 may display an image corresponding to the image data DATA as it is at the periphery of an area in which the temperature is low (or in a normal range), which is indicated by the digital-type temperature data D_TEP. The temperature image generator 430 may be controlled in response to the data control signal DCS. The temperature image generator 430 may output synthesized image data SDATA obtained by synthesizing the background image BIMG and the image data DATA with reference to the digital-type temperature data D_TEP.

The output circuit 440 may receive the synthesized image data DATA. The output circuit 440 may generate a data voltage Vdata corresponding to the synthesized image data SDATA. The data voltage Vdata generated in the output circuit 440 may be output through a data line DL (or a plurality of data lines DL).

The data control signal DCS may be input to the I/F1 450. The data control signal DCS input to the I/F1 may be input to components (e.g., the temperature image generator 430, the output circuit 440, and the like) in the data driver 130. The I/F1 450 may be implemented as an Inter-Integrated Circuit (I2C) interface. However, embodiments of the present disclosure are not limited thereto. For example, the I/F1 450 may be implemented as a Display Port (DP), an embedded Display Port (eDP), or the like.

The digital-type temperature data D_TEP may be output through the I/F1. The digital-type temperature data D_TEP output from the I/F1 may be input to the above-described controller 150 (see FIG. 1). The controller 150 may control various operations of the display device 100 (see FIG. 1) in response to the digital-type temperature data D_TEP.

In embodiments of the present disclosure, the data driver 130 may generate the synthesized image data SDATA, using the input temperature data TEP. Accordingly, a user of the display device 100 (see FIG. 1) can easily check that heat generation exists in the display device even when it is difficult for the temperature data TEP to be appropriately transmitted to the controller 150 as connection between the data driver 130 and the controller 150 (see FIG. 1) (e.g., connection of the I/F1) is deteriorated. Thus, a risk that the user using the display device 100 in accordance with the embodiments of the present disclosure will be injured (e.g., burned) can be considerably reduced. This advantage in use can be more effective in a device (e.g., a head-mounted display device, or the like) in which an image is displayed in a place very close to the user (e.g., an eye of the user).

The image data DATA may be input to the I/F2 460. The image data DATA input to the I/F2 460 may be input to the temperature image generator 430. The I/F2 460 may be implemented as, for example, a Low Voltage Differential Signaling (LVDS) interface. However, embodiments of the present disclosure are not limited thereto. For example, the I/F2 460 may be implemented as a Serial Peripheral Interface (SPI), a Mobile Industry Processor Interface (MIPI), or the like.

Figure 5:
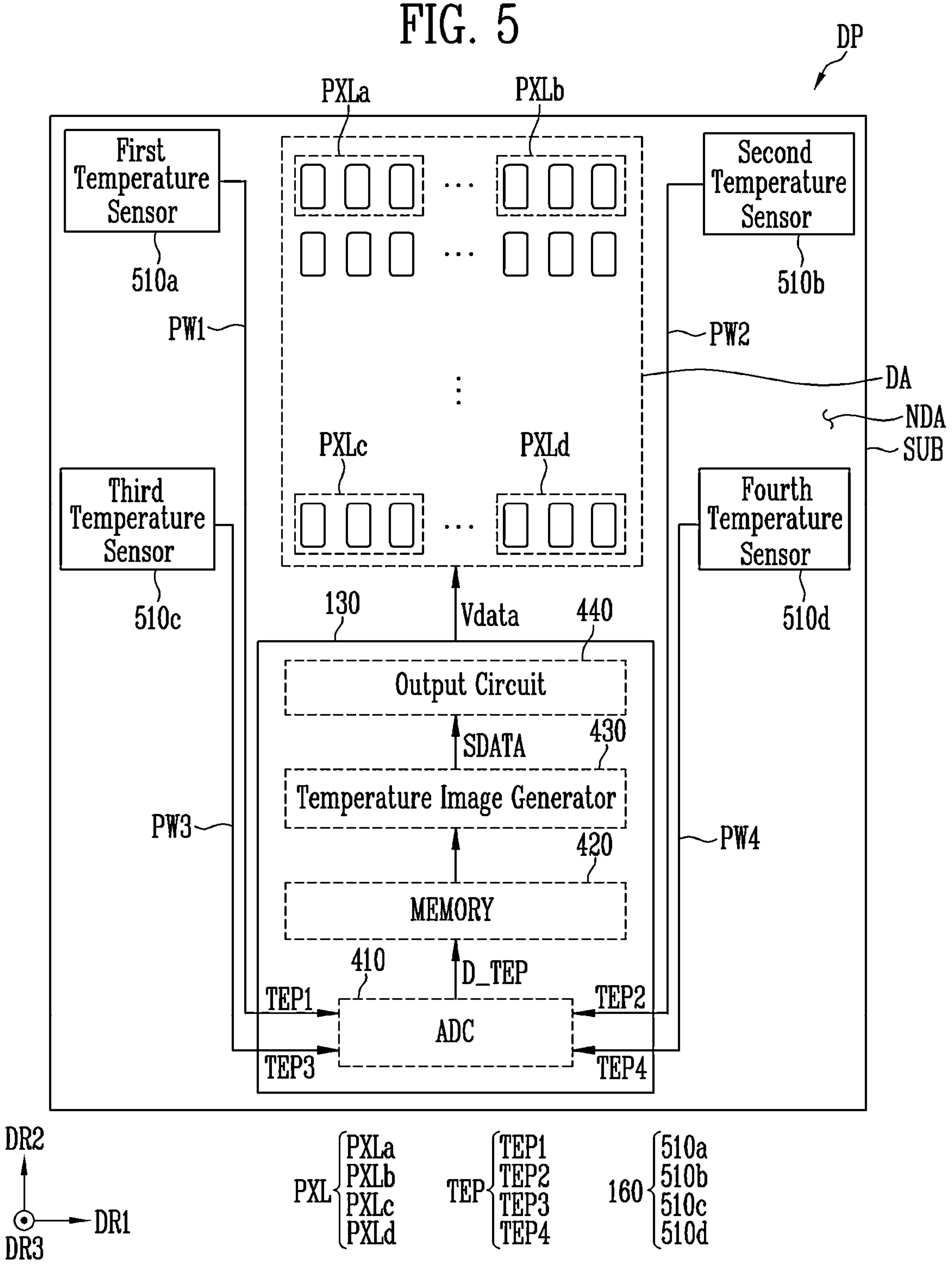
FIG. 5 is a plan view illustrating a display panel in accordance with embodiments of the present disclosure.

FIG. 5 is a plan view illustrating an example of a display panel DP in accordance with embodiments of the present disclosure.

The display panel DP shown in FIG. 5 may be applied to the display panel 110 shown in FIG. 1.

Referring to FIG. 5, the display panel DP may include display area DA and a non-display area NDA. The display panel DP may display an image through the display area DA. The non-display area NDA may be disposed at the periphery (e.g., in an edge area) of the display area DA.

The display panel DP may include a substrate SUB, a plurality of pixels PXL disposed (or formed) on the substrate SUB, and a plurality of pads (not shown) disposed (or formed) on the substrate SUB.

When the display panel DP in accordance with the embodiments of the present disclosure is used as a display screen of a Head-Mounted Display (HMD), a Virtual Reality (VR) device, a Mixed Reality (MR) device, an Augmented Reality (AR) device, and the like, the display panel DP may be located very close to eyes of a user. In the above embodiment, it may be required for the pixels PXL to be integrated with a relatively high density. In order to increase the integration of the pixels PXL, the substrate SUB in accordance with the embodiments of the present disclosure may be provided as a silicon substrate. The pixels PXL or the display panel DP may be formed on the substrate SUB as the silicon substrate. The display device 100 (see FIG. 1) including the display panel DP formed on the substrate SUB as the silicon substrate may be designated as an OLED on Silicon (OLEDoS) display device.

The plurality of pixels PXL may be disposed in the display area DA on the substrate SUB. Referring to FIG. 5, the pixels PXL may be arranged in a matrix form along the first direction DR1 and the second direction DR2 intersecting the first direction DR1. However, embodiments of the present disclosure are not limited thereto. For example, the plurality of pixels PXL in accordance with the embodiments of the present disclosure may be arranged in a zigzag form along the first direction DR1 and the second direction DR2. The first direction DR1 may be a row direction, and the second direction DR2 may be a column direction.

A component for controlling the pixels PXL may be disposed in the non-display area NDA on the substrate SUB. For example, lines such as the first to mth gate lines GL1 to GLm and the first to nth data lines DL1 to DLn, which are shown in FIG. 1, may be disposed to extend to at least a portion of the non-display area NDA.

At least one of the gate driving circuit 120, the data driver 130, the voltage generator 140, the controller 150, and the temperature sensor 160, which are shown in FIG. 1, may be disposed (e.g., integrated) in the non-display area NDA of the display panel DP.

In an embodiment, the gate driving circuit 120 shown in FIG. 1 may be formed and disposed in the non-display area NDA of the display panel DP. In another embodiment, the gate driving circuit 120 may be implemented as a separate integrated circuit distinguished from the display panel DP to be mounted in the non-display area NDA.

In an embodiment, the temperature sensor 160 shown in FIG. 1 may be disposed in the non-display area NDA to sense a temperature of the display panel DP. The temperature sensor 160 may be disposed at a corner (or vertex) or in an area corresponding thereto. Two or more temperature sensors 160 may be disposed in the display panel DP.

The pads may interface the display panel DP with other components of the display device 100 (see FIG. 1). In embodiments, voltages and signals, which are necessary for operations of components included in the display panel DP, may be provided to the plurality of pixels PXL from the data driver 130 through the pads.

In embodiments, a circuit board may be electrically connected to the pads, using a conductive adhesive member such as an anisotropic conductive film. The circuit board may be a Flexible Printed Circuit Board (FPCB) or a flexible film, which has a flexible material. The driver integrated circuit DIC (see FIG. 1) may be mounted on the circuit board to be electrically connected to the pads.

In embodiments, the display area DA may have various shapes. For example, the display area DA may have a closed-loop shape including linear sides or curved sides. For example, the display area DA may have shapes such as a polygon, a circle, a semicircle, and an ellipse.

In embodiments, the display panel DP may have a flat display surface. In other embodiments, the display panel DP may at least partially have a round display surface. In embodiments, the display panel DP may be bendable, foldable or rollable. The display panel DP or the substrate SUB may include rigid or flexible materials.

Referring to FIG. 5, an embodiment in which the temperature sensor 160 is disposed in an area corresponding to a corner of the display area DA is illustrated. The temperature sensor 160 may include first to fourth temperature sensors 510*a*, 510*b*, 510*c*, and 510*d* (hereinafter, indicated as 510*a* to 510*d*) respectively disposed in areas corresponding to four corners of the display area DA.

A first temperature sensor 510*a* may be located in a left upper end area when the display panel DP is viewed in one direction (e.g., a third direction DR3). The first temperature sensor 510*a* may be located adjacent to a first pixel PXLa located at a left upper end in the display area DA.

A second temperature sensor 510*b* may be located in a right upper end area when the display panel DP is viewed in the one direction (e.g., the third direction DR3). The second temperature sensor 510*b* may be located adjacent to a second pixel PXLb located at a right upper end in the display area DA.

A third temperature sensor 510*c* may be located in a left lower end area when the display panel DP is viewed in the one direction (e.g., the third direction DR3). The third temperature sensor 510*c* may be located adjacent to a third pixel PXLc located at a left lower end in the display area DA.

A fourth temperature sensor 510*d* may be located in a right lower end area when the display panel DP is viewed in the one direction (e.g., the third direction DR3). The fourth temperature sensor 510*d* may be located adjacent to a fourth pixel PXLd located at a right lower end in the display area DA.

The first to fourth temperature sensors 510*a* to 510*d* may output different temperature data TEP according to temperatures sensed in the corresponding temperature sensors, respectively. The temperature data TEP may be provided, for example, in the form of a voltage or a current, but embodiments of the present disclosure are not limited thereto. The temperature data TEP may be provided through a panel line PW.

Each of the first to fourth temperature sensors 510*a* to 510*d* may be connected to the panel line PW. Referring to FIG. 5, the first to fourth temperature sensors 510*a* to 510*d* may be connected to first to fourth panel lines PW1 to PW4, respectively.

The first temperature sensor 510*a* may output first temperature data TEP1 through the first panel line PW1. The second temperature sensor 510*b* may output second temperature data TEP2 through the second panel line PW2. The third temperature sensor 510*c* may output third temperature data TEP3 through the third panel line PW3. The fourth temperature sensor 510*d* may output fourth temperature data TEP4 through the fourth panel line PW4.

The first to fourth panel lines PW1 to PW4 may be disposed in the non-display area NDA of the substrate SUB. The first to fourth panel lines PW1 to PW4 may be connected to the ADC 410.

The ADC 410 may convert the temperature data TEP into digital-type temperature data D_TEP. The digital-type temperature data D_TEP may be stored in the memory 420. The temperature image generator 430 may generate synthesized image data SDATA with reference to the digital-type temperature data D_TEP stored in the memory 420. The output circuit 440 may output a data voltage Vdata corresponding to the synthesized image data SDATA.

The ADC 410 may sense (e.g., sequentially sense according a predetermined order) a plurality of sensors 510*a* to 510*d*. The ADC 410 may output (e.g., sequentially output) digital-type temperature data D_TEP generated by sensing the plurality of sensors 510*a* to 510*d*.

A plurality of digital-type temperature data D_TEP generated by sequentially sensing the plurality of sensors 510*a* to 510*d* may be stored in the memory 420.

The temperature image generator 430 may generate synthesized image data SDATA by synthesizing a background image BIMG (see FIG. 4) and image data DATA (see FIG. 4) such that the background image BIMG is displayed in an area decided to be at a high temperature among the plurality of digital-type temperature data D_TEP.

Figure 6:
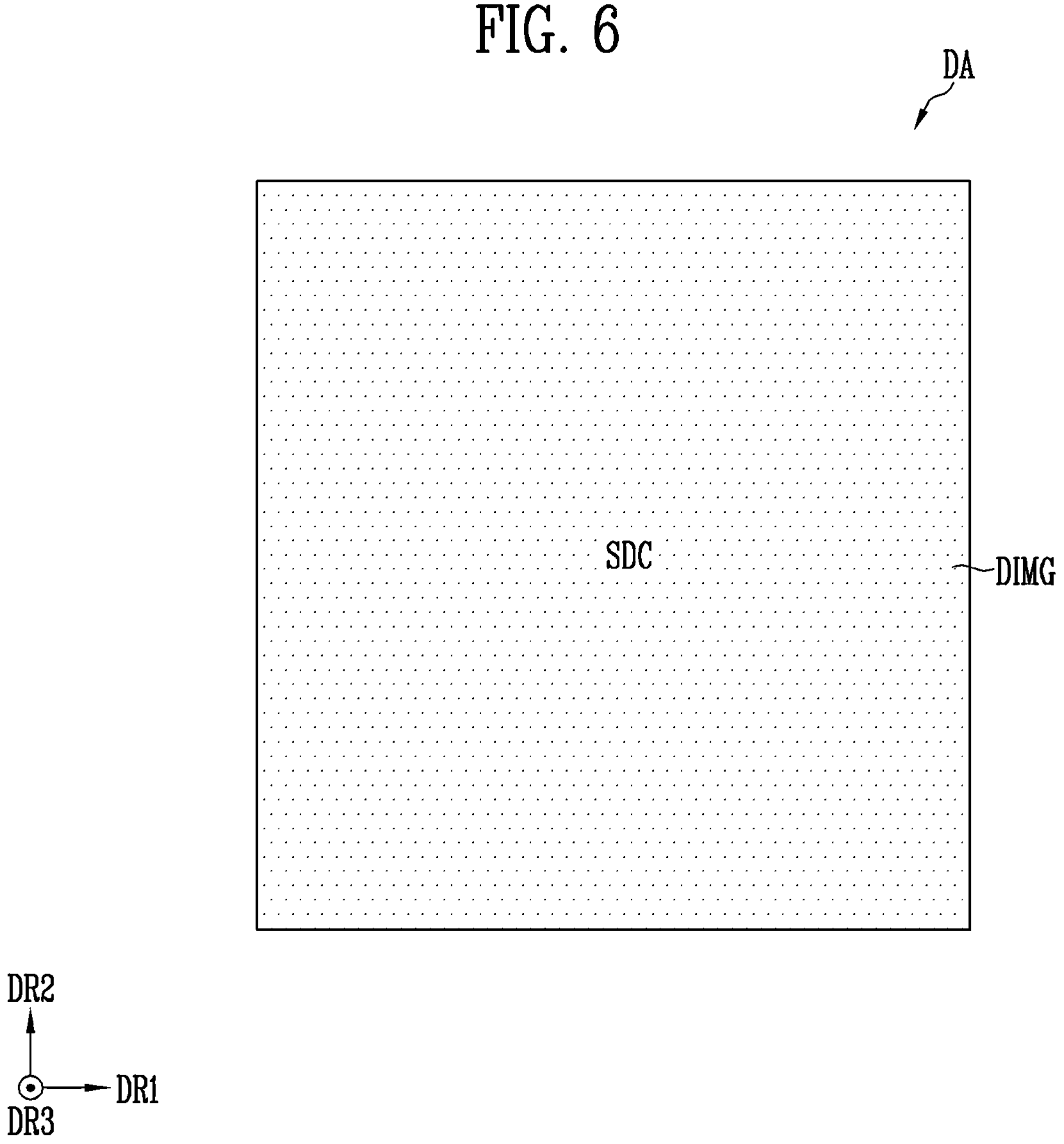
FIG. 6 is an example of an image displayed in a display area in accordance with embodiments of the present disclosure.

FIG. 6 is an example of an image displayed in a display area DA in accordance with embodiments of the present disclosure.

Referring to FIG. 6, a reference image DIMG may be displayed in the display area DA. The reference image DIMG shown in FIG. 6 may indicate an image displayed in a case where a temperature at the periphery of the display area DA is in a normal range.

Figure 7:
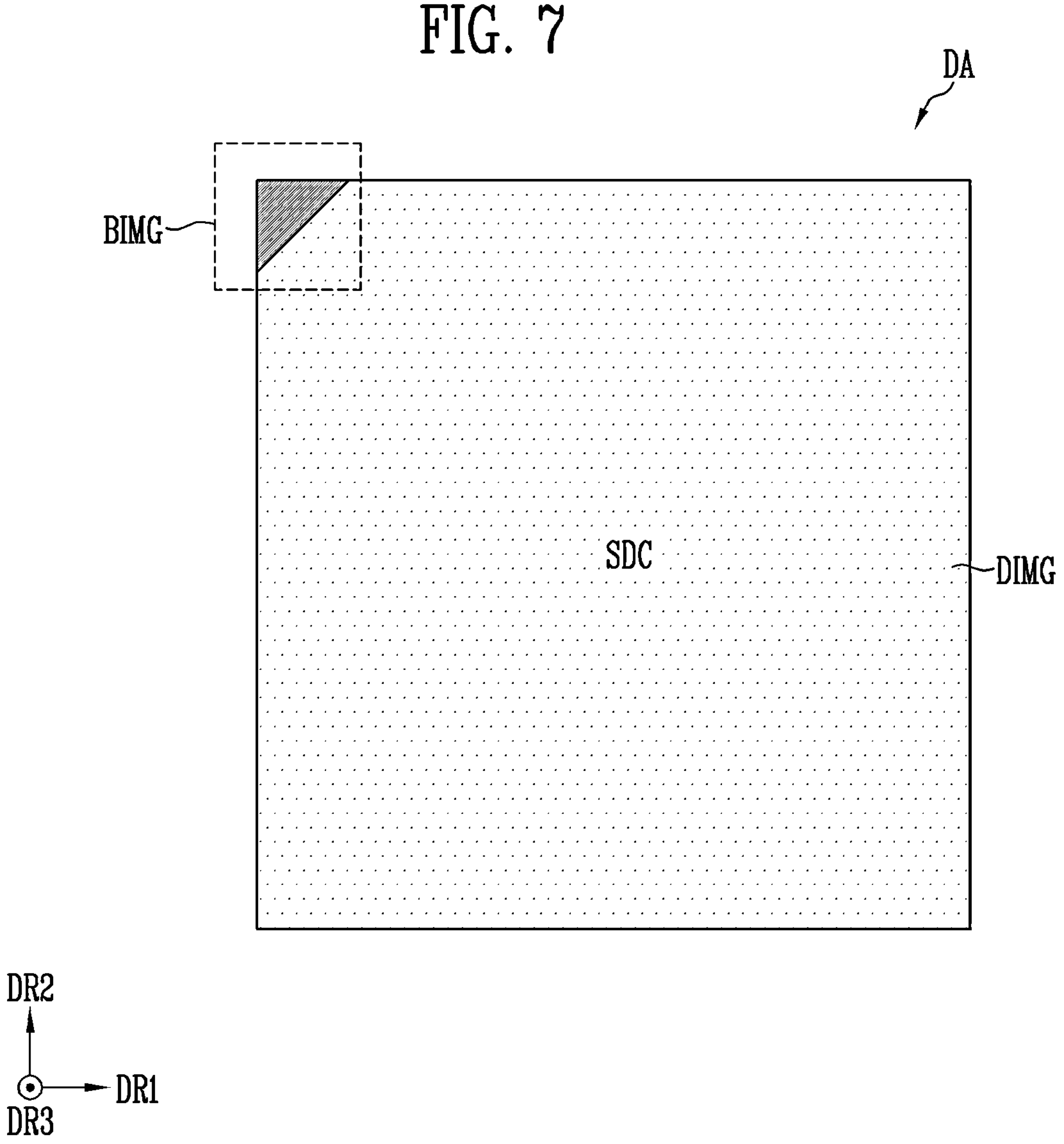
FIG. 7 is an example of an image obtained by synthesizing a background image in a corner area of the image shown in FIG. 6.

FIG. 7 is an example of an image obtained by synthesizing a background image BIMG in a corner area of the image shown in FIG. 6.

Referring to FIG. 7, a background image BIMG may be synthesized with the reference image DIMG to be displayed in a left upper end corner area of the reference image DIMG. Further referring to the above-described FIG. 5, the first temperature sensor 510*a* located at the left upper end of the display area DA may output the first temperature data TEP1, and the first temperature data TEP1 may be a high temperature (or a temperature exceeding a predetermined threshold temperature). Each of the second to fourth temperature data TEP2 to TEP4 may be in a normal range (or a temperature equal to or lower than the predetermined threshold temperature). The temperature image generator 430 may output synthesized image data SDATA obtained by synthesizing the background image BIMG at the periphery of an area in which the first temperature data TEP1 is sensed, with reference to the memory 420. Accordingly, the background image BIMG may be synthesized with the reference image DIMG to be displayed in the left upper end corner area.

The background image BIMG may be displayed in an area in which any main content is not displayed in the display area DA. For example, a text-type main content such as "SDC" may be displayed in a central area of the display area DA. The background image BIMG may be displayed in an area in which a notification related to heat generation can be visually provided to the user of the display device 100 (see FIG. 1) while being not the area in which the main content is displayed.

Figure 8:
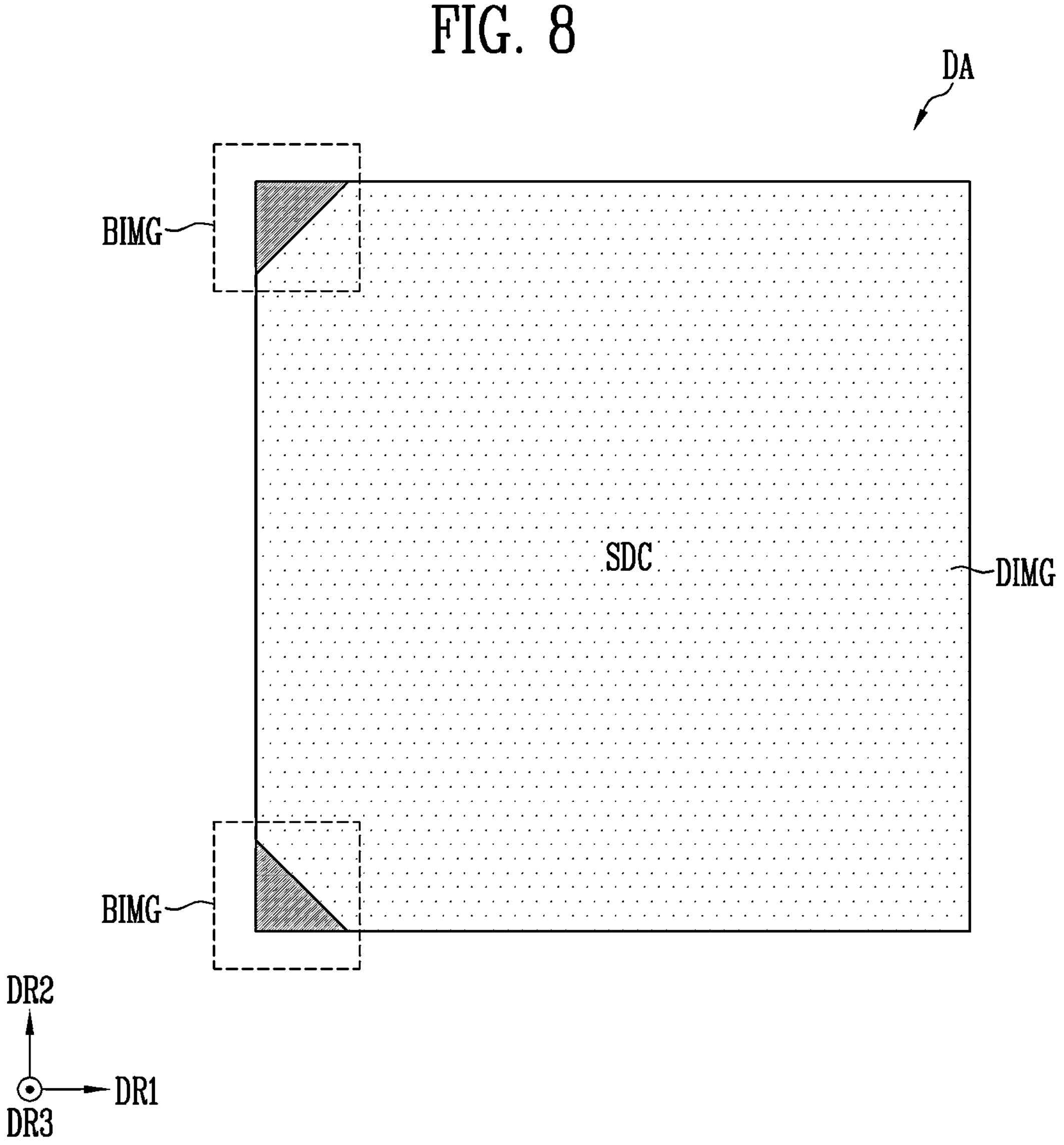
FIG. 8 is another example of the image obtained by synthesizing the background image in the corner area of the image shown in FIG. 6.

FIG. 8 is another example of the image obtained by synthesizing the background image in the corner area of the image shown in FIG. 6.

Referring to FIG. 8, the background image BIMG may be synthesized with the reference image DIMG to be displayed in left upper end and left lower end corner areas of the reference image DIMG. Further referring to the above-described FIG. 5, the first temperature sensor 510*a* located at the left upper end of the display area DA may output the first temperature data TEP1, and the first temperature data TEP1 may be a high temperature (or a temperature exceeding the predetermined threshold temperature). The third temperature sensor 510*c* located at the left lower end of the display area DA may output the third temperature data TEP3, and the third temperature data TEP3 may be a high temperature (or a temperature exceeding the predetermined threshold temperature). Each of the second and fourth temperature data TEP2 and TEP4 may be in a normal range (or a temperature equal to or lower than the predetermined threshold temperature). The temperature image generator 430 may output synthesized image data SDATA obtained by synthesizing the background image BIMG at the periphery of areas in which the first temperature data TEP1 and the third temperature data TEP3 are sensed, with reference to the memory 420. Accordingly, the background image BIMG may be synthesized with the reference image DIMG to be displayed in the left upper end and left lower end corner areas.

Figure 9:
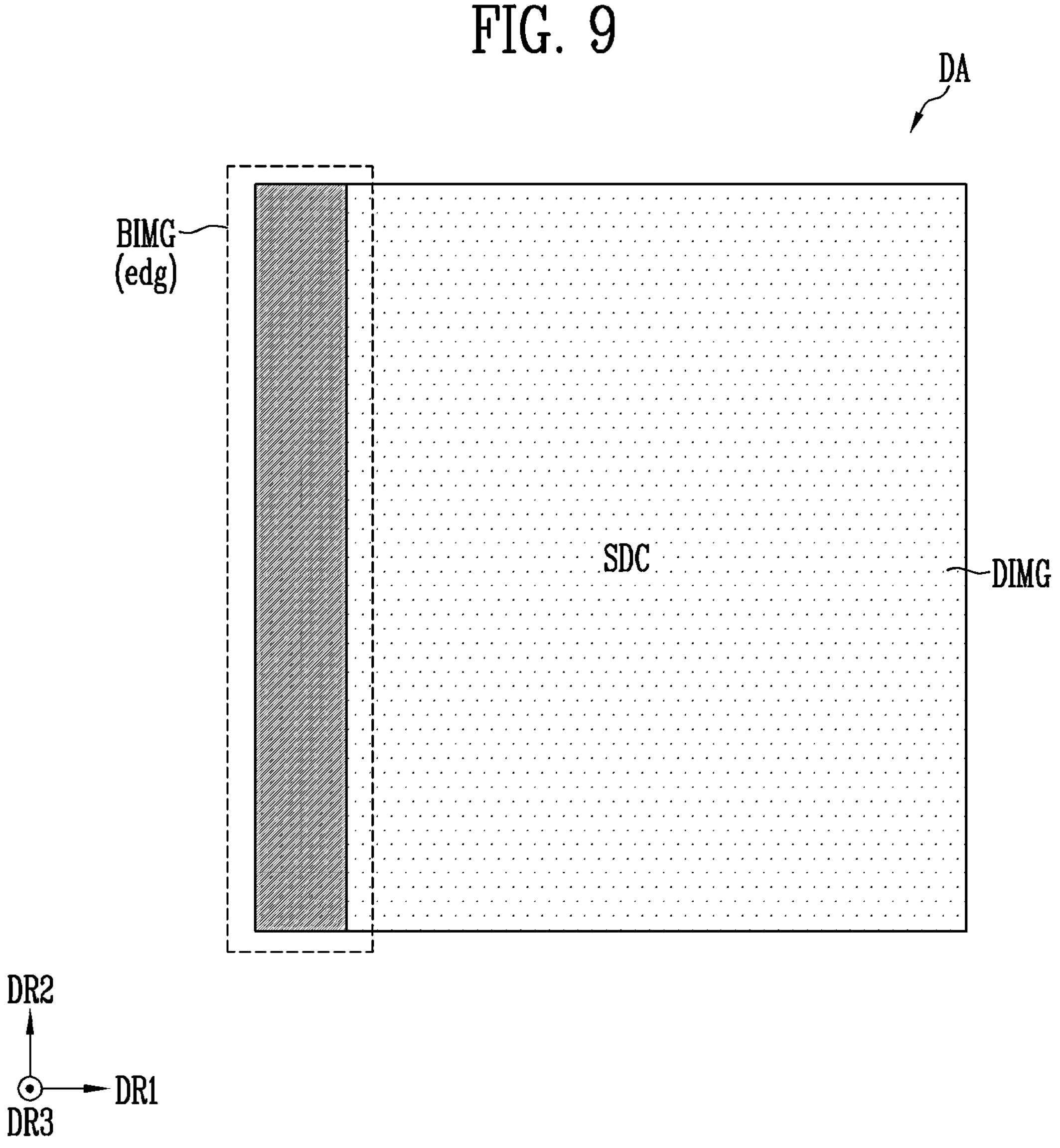
FIG. 9 is an example of an image obtained by synthesizing a background image in an edge area of the image shown in FIG. 6.

FIG. 9 is an example of an image obtained by synthesizing a background image in an edge area of the image shown in FIG. 6.

Referring to FIG. 9, the background image BIMG may be synthesized with the reference image DIMG to be displayed in an edge area edg in which the left upper end and left lower end corners are connected to each other. Further referring to the above-described FIG. 5, the first temperature sensor 510*a* located at the left upper end of the display area DA may output the first temperature data TEP1, and the first temperature data TEP1 may be a high temperature (or a temperature exceeding the predetermined threshold temperature). The third temperature sensor 510*c* located at the left lower end of the display area DA may output the third temperature data TEP3, and the third temperature data TEP3 may be a high temperature (or a temperature exceeding the predetermined threshold temperature). Each of the second and fourth temperature data TEP2 and TEP4 may be in a normal range (or a temperature equal to or lower than the predetermined threshold temperature). The temperature image generator 430 may output synthesized image data SDATA obtained by synthesizing the background image BIMG in areas in which the first temperature data TEP1 and the third temperature data TEP3 are sensed and an edge area in which the areas are connected to each other, with reference to the memory 420. Accordingly, the background image BIMG may be synthesized with the reference image DIMG to be displayed in the edge area edg in which the left upper end and left lower end corners are connected to each other.

However, embodiments of the present disclosure are not limited thereto. Further referring to FIG. 5, when temperature data which is a high temperature (or a temperature exceeding the predetermined threshold temperature) is generated in any one of the first to fourth temperature sensors 510*a* to 510*d*, the background image BIMG may be synthesized with the reference image DIMG to be in all edge areas edg of the display area DA.

Figure 10:
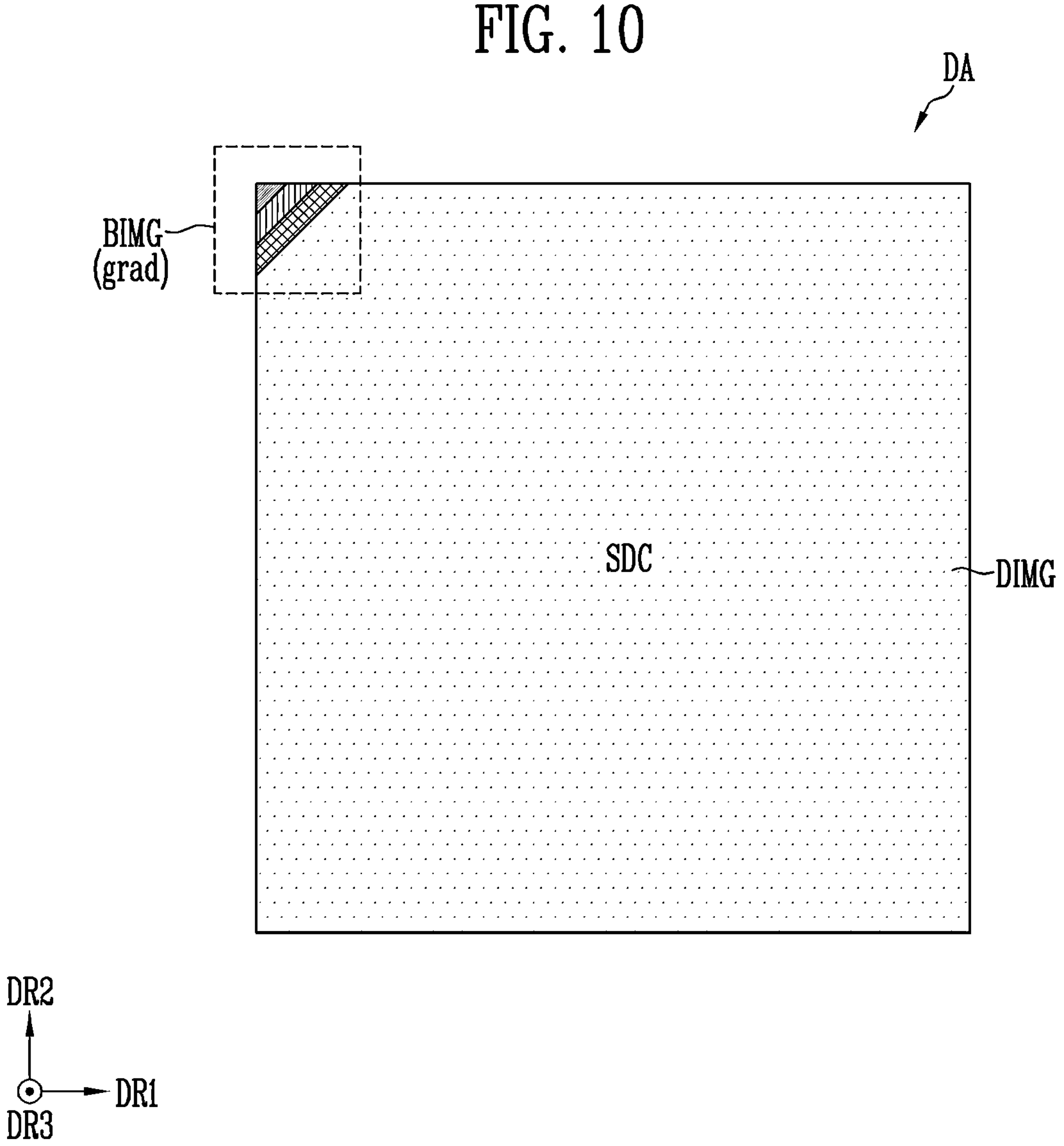
FIG. 10 is an example of an image obtained by synthesizing a gradation-processed background image in a corner area of the image shown in FIG. 6.

FIG. 10 is an example of an image obtained by synthesizing a gradation-processed background image in a corner area of the image shown in FIG. 6.

Referring to FIG. 10, the background image BIMG may be synthesized with the reference image DIMG to be displayed in left upper end and left lower end corner areas of the reference image DIMG. The background image BIMG may be a gradation-processed background image.

The background image BIMG may be differently gradation-processed according to a temperature of the corresponding area. For example, the light/shade of gradation may be differently processed according to a temperature sensed in a temperature sensor located adjacent to the corresponding area.

Further referring to the above-described FIG. 5, the first temperature sensor 510*a* located at the left upper end of the display area DA may output the first temperature data TEP1, and the first temperature data TEP1 may be a high temperature (or a temperature exceeding the predetermined threshold temperature). Each of the second and fourth temperature data TEP2 and TEP4 may be in a normal range (or a temperature equal to or lower than the predetermined threshold temperature). The temperature image generator 430 may output synthesized image data SDATA obtained by synthesizing the background image BIMG at the periphery of an area in which the first temperature data TEP1 is sensed, with reference to the memory 420. Accordingly, the background image BIMG may be synthesized with the reference image DIMG to be displayed in the left upper end corner area. In the above embodiment, the size, light/shade, and the like of the gradation may be differently processed according to a value of the first temperature data TEP1.

Figure 11:
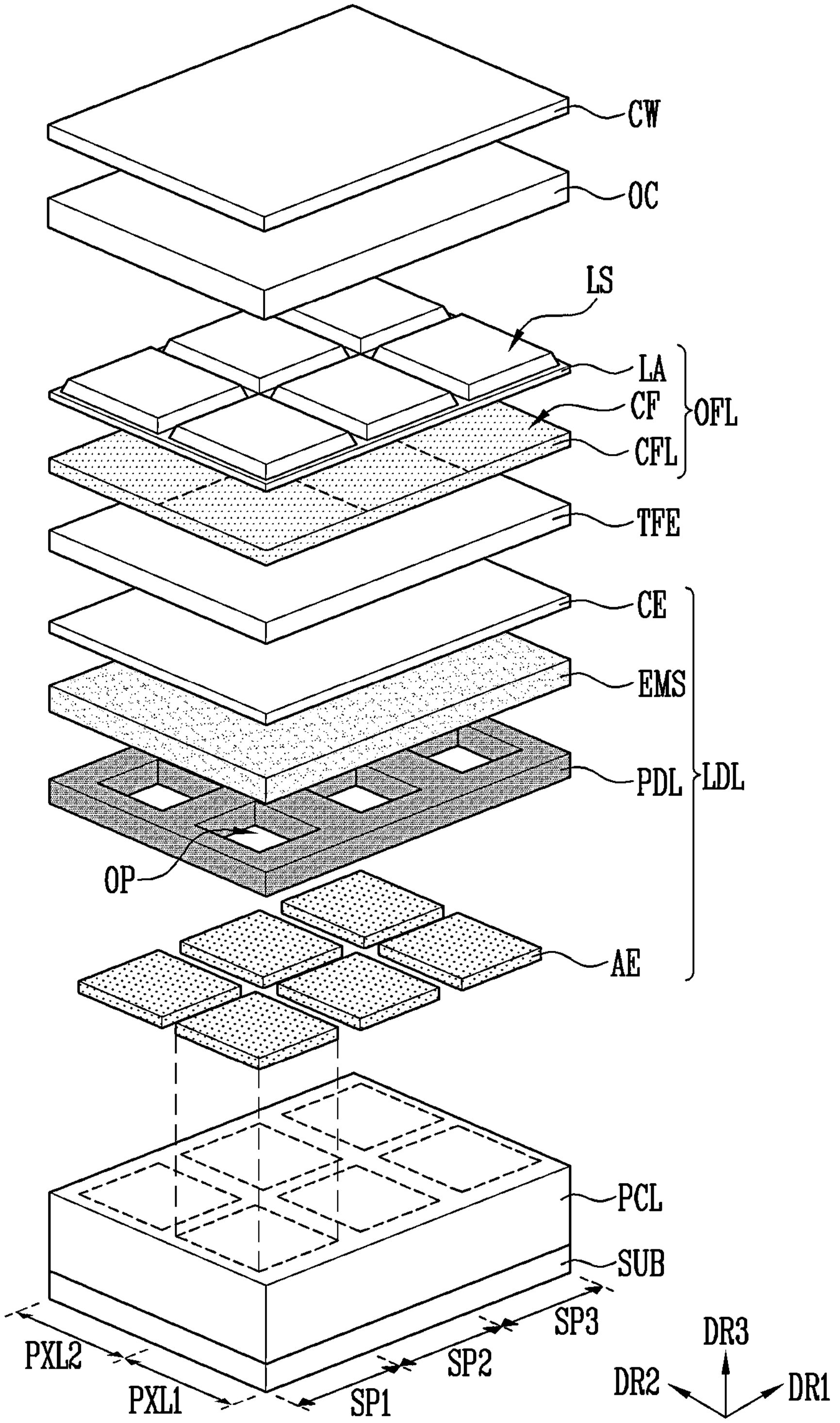
FIG. 11 is an exploded perspective view illustrating a portion of the display panel shown in FIG. 5.

FIG. 11 is an exploded perspective view illustrating a portion of the display panel DP shown in FIG. 5.

In FIG. 11, for clear and brief description, a portion of the display panel DP, which corresponds to first and second pixels PXL1 and PXL2 among the pixels PXL shown in FIG. 5, is schematically illustrated. A portion of the display panel DP, which corresponds to the other pixels, may also be configured identically.

Referring to FIGS. 5 and 11, the first and second pixels PXL1 and PXL2 may be adjacent to each other in the second direction DR2. Each of the first and second pixels PXL1 and PXL2 may include a plurality of sub-pixels. Referring to FIG. 5, each of the first and second pixels PXL1 and PXL2 may include first, second, and third sub-pixels SP1, SP2, and SP3. However, embodiments of the present disclosure are not limited thereto. For example, each of the first and second pixels PXL1 and PXL2 may include four sub-pixels or include two sub-pixels.

In FIG. 11, it is illustrated that the first to third sub-pixels SP1 to SP3 may have quadrangular shapes when viewed in the third direction DR3 intersecting the first and second directions DR1 and DR2 (e.g., perpendicular to the first and second directions DR1 and DR2), and have the same size. However, embodiments of the present disclosure are not limited thereto. The first to third sub-pixels SP1 to SP3 may be modified to have various shapes.

The display panel DP may include a substrate SUB, a pixel circuit layer PCL, a light emitting element layer LDL, a thin film encapsulation layer TFE, an optical functional layer OFL, an overcoat layer OC, and a cover window CW.

In embodiments, the substrate SUB may include a silicon wafer substrate formed using a semiconductor process. The substrate SUB may include a semiconductor material suitable for forming circuit elements. For example, the semiconductor material may include silicon, germanium, or silicon-germanium. The substrate SUB may be provided from a bulk wafer, an epitaxial layer, a Silicon On Insulator (SOI) layer, a Semiconductor On Insulator (SeOI) layer, or the like. In other embodiments, the substrate SUB may include a glass substrate. In still other embodiments, the substrate SUB may include a polyimide (PI) substrate.

The pixel circuit layer PCL may be disposed on the substrate SUB. The substrate SUB or the pixel circuit layer PCL may include insulating layers and conductive patterns disposed between the insulating layers. The conductive patterns of the pixel circuit layer PCL may serve as at least some of circuit elements, lines, and the like. The conductive patterns may include copper, but embodiments of the present disclosure are not limited thereto.

The circuit elements may include a sub-pixel circuit SPC (see FIG. 2) of each of the first to third sub-pixels SP1 to SP3. The sub-pixel circuit SPC may include at least two transistors and at least one capacitor. Each transistor may include a semiconductor portion including a source region, a drain region, and a channel region, and a gate electrode overlapping with the semiconductor portion (e.g., the channel region). In embodiments, when the substrate SUB is provided as a silicon substrate, the semiconductor portion may be included in the substrate SUB, and the gate electrode may be included as a conductive pattern of the pixel circuit layer PCL in the pixel circuit layer PCL. In embodiments, when the substrate SUB is provided as a glass substrate or a PI substrate, the semiconductor portion and the gate electrode may be included in the pixel circuit layer PCL. The capacitor may include electrodes spaced apart from each other (e.g., face each other). For example, each capacitor may include electrodes spaced apart from each other on a plane defined by the first and second directions DR1 and DR2. For example, the capacitor may include electrodes spaced apart from each other in the third direction DR3 with an insulating layer interposed therebetween.

The lines of the pixel circuit layer PCL may include signal lines, e.g., a gate line, an emission control line, a data line, and the like, which are connected to each of the first to third sub-pixels SP1 to SP3. The lines may further include a line connected to the first power voltage node VDDN shown in FIG. 2. The lines may further include a line connected to the second power voltage node VSSN shown in FIG. 2.

The light emitting element layer LDL may include anode electrodes AE, a pixel defining layer PDL, a light emitting structure EMS, and a cathode electrode CE.

The anode electrodes AE may be disposed on the pixel circuit layer PCL. The anode electrodes AE may be connected to (e.g., in contact with) the circuit elements of the pixel circuit layer PCL. The anode electrodes AE may include an opaque conductive material capable of reflecting light. However, embodiments of the present disclosure are not limited thereto.

The pixel defining layer PDL may be disposed on the anode electrodes AE. The pixel defining layer PDL may include an opening OP exposing a portion of each of the anode electrodes AE. The opening OP of the pixel defining layer PDL may be an emission area of each of the first to third sub-pixels SP1 to SP3.

In embodiments, the pixel defining layer PDL may include an inorganic material. In the above embodiment, the pixel defining layer PDL may include an inorganic layer (e.g., a plurality of stacked inorganic layers). For example, the pixel defining layer PDL may include silicon oxide ($SiO_x$) or silicon nitride ($SiN_x$). In other embodiments, the pixel defining layer PDL may include an organic layer including an organic material. However, the material constituting material of the pixel defining layer PDL in accordance with the embodiments of the present disclosure is not limited as described above.

The light emitting structure EMS may be disposed on the anode electrodes AE exposed by the openings OP of the pixel defining layer PDL. The light emitting structure EMS may include at least one functional layer. The light emitting structure EMS may include, for example, functional layers such as a light generation layer (or light emitting layer) (not shown) configured to generate light, an electron transport layer configured to transport electrons, and a hole transport layer configured to transport holes.

In embodiments, the light emitting structure EMS may fill the openings OP of the pixel defining layer PDL. In embodiments, the light emitting structure EMS may be entirely disposed on the top of the pixel defining layer PDL. For example, the light emitting structure EMS may extend throughout the first to third sub-pixels SP1 to SP3. In the above embodiment, at least some of the functional layers in the light emitting structure EMS may be cut or bent at boundaries between the first to third sub-pixels SP1 to SP3. However, embodiments of the present disclosure are not limited thereto. For example, portions of the light emitting structure EMS, which correspond to the first to third sub-pixels SP1 to SP3, may be separated from each other, and each of the portions may be disposed in the opening OP of the pixel defining layer PDL.

The cathode electrode CE may be disposed on the light emitting structure EMS. The cathode electrode CE may extend throughout the first to third sub-pixels SP1 to SP3. The cathode electrode CE may be provided as a common electrode commonly connected to the first to third sub-pixels SP1 to SP3.

The cathode electrode CE may have light transmissivity. For example, the cathode electrode CE may be a thin metal layer having a thickness to a degree to which light emitted from the light emitting structure EMS can be transmitted therethrough. The cathode electrode CE may be formed of a metal material to have a relatively thin thickness or be formed of a conductive material having light transmissivity (e.g., transparency). In embodiments, the cathode electrode CE may include at least one of various transparent conductive materials including indium tin oxide, indium zinc oxide, indium tin zinc oxide, aluminum zinc oxide, gallium zinc oxide, zinc tin oxide, and gallium tin oxide. However, the material constituting the cathode electrode CE in accordance with the embodiments of the present disclosure is not limited as described above. The cathode electrode CE may serve as a half mirror which allows light emitted from the light emitting structure EMS to be partially transmitted therethrough and allows light emitted from the light emitting structure EMS to be partially reflected therefrom.

It may be understood that any one of the anode electrodes AE, a portion of the light emitting structure EMS, which overlaps therewith, and a portion of the cathode electrode CE, which overlaps therewith, constitute one light emitting element LD (see FIG. 2). Each of light emitting elements LD of the first to third sub-pixels SP1 to SP3 may include one anode electrode AE, a portion of the light emitting structure EMS, which overlaps therewith, and a portion of the cathode electrode CE, which overlaps therewith. In each of the first to third sub-pixels SP1 to SP3, holes injected from the anode electrode AE and electrons injected from the cathode electrode CE may be transported into the light emitting structure EMS to form excitons, and light may be generated when the excitons are changed from an excited state to a ground state. A luminance of the light may be determined according to an amount of current flowing through the light emitting structure EMS. A wavelength band of the generated light may be determined according to a configuration of the light emitting structure EMS.

The thin film encapsulation layer TFE may be disposed over the cathode electrode CE. The thin film encapsulation layer TFE may cover the light emitting element layer LDL or the pixel circuit layer PCL. The thin film encapsulation layer TFE may be configured to prevent oxygen or moisture from infiltrating into the light emitting element layer LDL. In embodiments, the thin film encapsulation layer TFE may include a structure in which at least one inorganic layer and at least one organic layer are alternately stacked. For example, the inorganic layer may include silicon nitride, silicon oxide, silicon oxynitride ($SiO_xN_y$), or the like. For example, the organic layer may include an organic insulating material such as acrylic resin, epoxy resin, phenolic resin, polyamide resin, polyimide resin, unsaturated polyester resin, polyphenylene resin, polyphenylenesulfide resin, or benzocyclobutene (BCB). However, the materials of the organic layer and the inorganic layer of the thin film encapsulation layer TFE are not limited as described above.

In order to improve encapsulation efficiency of the thin film encapsulation layer TFE, the thin film encapsulation layer TFE may further include a thin film including aluminum oxide ($AlO_x$). The thin film including the aluminum oxide may be located on a top surface of the thin film encapsulation layer TFE, which faces the optical functional layer OFL, or a bottom surface of the thin film encapsulation layer TFE, which faces the light emitting element layer LDL. The thin film including the aluminum oxide may be formed through an Atomic Layer Deposition (ALD) process. However, embodiments of the present disclosure are not limited thereto. The thin film encapsulation layer TFE may further include a thin film formed of at least one of various materials suitable for the improvement of the encapsulation efficiency.

The optical functional layer OFL may be disposed on the thin film encapsulation layer TFE. The optical functional layer OFL may include a color filter layer CFL and a lens array LA. In embodiments, the optical functional layer OFL may be attached to the thin film encapsulation layer TFE through an adhesive layer (not shown). For example, the optical functional layer OLF may be separately manufactured to be attached to the thin film encapsulation layer TFE through the adhesive layer. The adhesive layer may further perform a function of protecting lower layers including the thin film encapsulation layer TFE.

The color filter layer CFL may be disposed between the thin film encapsulation layer TFE and the lens array LA. The color filter layer CFL may be configured filter light emitted from the light emitting structure EMS, thereby selectively outputting light having a wavelength band corresponding to each sub-pixel. The color filter layer CFL may include color filters CF respectively corresponding to the first to third sub-pixels SP1 to SP3. Each of the color filters CF may allow light having a wavelength band corresponding to a corresponding sub-pixel to pass therethrough. For example, a color filter corresponding to the first sub-pixel SP1 may allow light of a red color to pass therethrough, a color filter corresponding to the second sub-pixel SP2 may allow light of a green color to pass therethrough, and a color filter corresponding to the third sub-pixel SP3 may allow light of a blue color to pass therethrough. According to light emitted from the light emitting structure EMS in each sub-pixel, at least some of the color filters CF may be omitted. In some embodiments, the color filter layer CFL may be omitted. In embodiments, the color filters CF may overlap (e.g., partially overlap) with each other in boundary areas between the first to third sub-pixels SP1 to SP3. In other embodiments, the color filters CF may be spaced apart from each other in the boundary areas between the first to third sub-pixels SP1 to SP3, and a black matrix may be provided between the color filters CF.

The lens array LA may be disposed on the color filter layer CFL. The lens array LA may include lenses LS respectively corresponding to the first to third sub-pixels SP1 to SP3. Each of the lenses LS may output light emitted from the light emitting structure EMS along an intended path, thereby improving light emission efficiency. In embodiments, the lenses LS may include an organic material. In embodiments, the lenses LS may include an acryl-based material. However, the material of the lenses LS is not limited thereto.

In embodiments, as compared with the opening OP of the pixel defining layer PDL, at least some of the color filters CF of the color filter layer CFL and at least some of the lenses LS of the lens array LA may be shifted in a direction parallel to a plane defined by the first and second directions DR1 and DR2. Specifically, in a central area of the display area DA, the center of the color filter CF and the center of the lens LS may be aligned or overlap with the center of a corresponding opening OP of the pixel defining layer PDL when viewed in the third direction DR3. For example, in the central area of the display area DA, the opening OP of the pixel defining layer PDL may completely overlap with a corresponding color filter CF of the color filter layer CFL and a corresponding lens LS of the lens array LA. In an area adjacent to the non-display area NDA of the display area DA, the center of the color filter CF and the center of the lens LS may be shifted in a plane direction from the center of the opening OP of the pixel defining layer PDL when viewed in the third direction DR3. For example, in an area adjacent to the non-display area NDA of the display area DA, the opening OP of the pixel defining layer PDL may partially overlap with a corresponding color filter CF of the color filter layer CFL and a corresponding lens LS of the lens array LA. Accordingly, at the center of the display area DA, light emitted from the light emitting structure EMS can be efficiently output in a normal direction of the display surface. At an outer portion of the display area DA, light emitted from the light emitting structure EMS can be efficiently output in a direction inclined by a predetermined angle with respect to the normal direction.

The overcoat layer OC may be disposed over the lens array LA. The overcoat layer OC may cover the optical functional layer OFL, the thin film encapsulation layer TFE, the light emitting structure EMS, or the pixel circuit layer PCL. The overcoat layer OC may include various materials suitable for protecting lower layers thereof from foreign matters such as dust and moisture.

The cover window CW may be disposed on the overcoat layer OC. The cover window CW may be configured to protect lower layers thereof. In some embodiments, the cover window CW may include glass, metal, and the like, which have light transmissivity (e.g., transparency). However, embodiments of the present disclosure are not limited thereto.

Further referring to FIG. 5, the temperature sensor 160 in accordance with the embodiments of the present disclosure may be disposed in the same layer as the pixel circuit layer PCL. In some embodiments, the temperature sensor 160 may be disposed in the same layer as the light emitting element layer LDL. In some embodiments, the temperature sensor 160 may be disposed in the same layer as the thin film encapsulation layer TFE. In some embodiments, the temperature sensor 160 may be disposed in the same layer as the optical functional layer OFL. In some embodiments, the temperature sensor 160 may be covered by the overcoat layer OC. In some embodiments, the temperature sensor 160 may be located while overlapping with the cover window CW.

Figure 12:
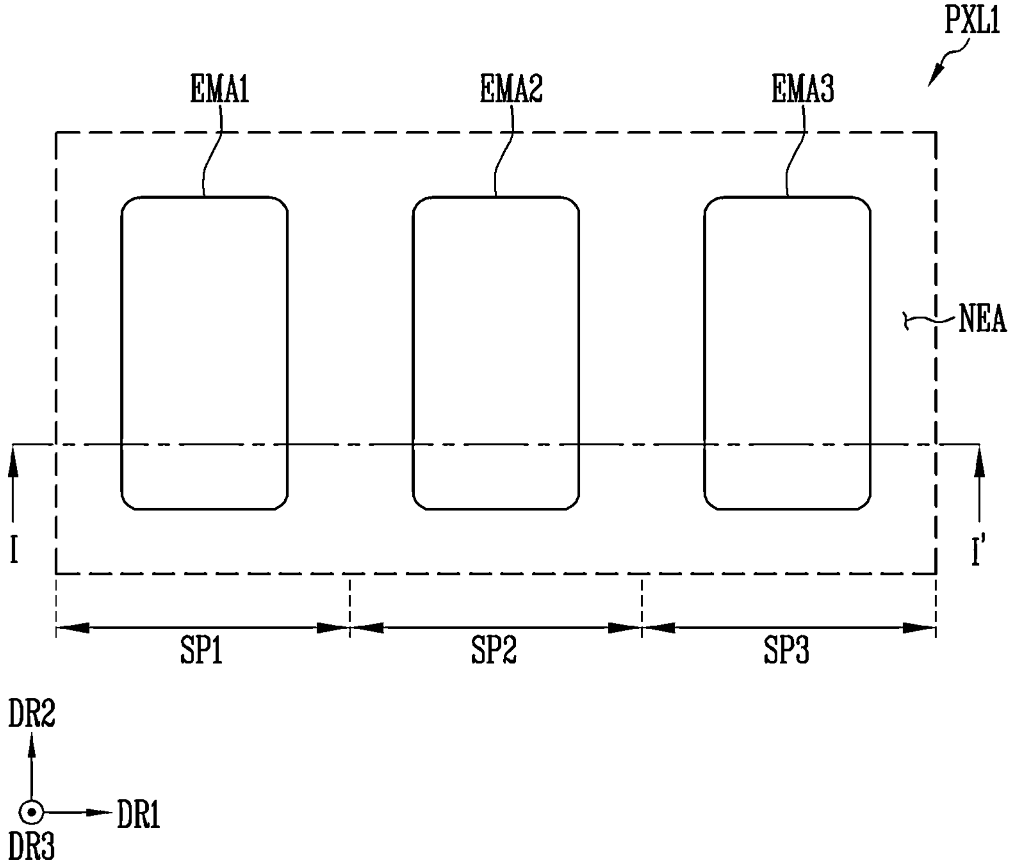
FIG. 12 is a plan view illustrating an embodiment of any one of pixels shown in FIG. 11.

FIG. 12 is a plan view illustrating an embodiment of any one of the pixels shown in FIG. 11.

In FIG. 12, for clear and brief description, the first pixel PXL1 among the first and second pixels PXL1 and PXL2 shown in FIG. 11 is schematically illustrated. The other pixels may be configured identically to the first pixel PXL1. The first pixel PXL1 may include first to third sub-pixels SP1 to SP3 arranged in the first direction DR1.

The first sub-pixel SP1 may include a first emission area EMA1 and a non-emission area NEA at the periphery of the first emission area EMA1. The second sub-pixel SP2 may include a second emission area EMA2 and the non-emission area at the periphery of the second emission area EMA2. The third sub-pixel SP3 may include a third emission area EMA3 and the non-emission area at the periphery of the third emission area EMA3.

The first emission area EMA1 may be an area in which light is emitted from a portion of the light emitting structure EMS (see FIG. 11), which corresponds to the first sub-pixel SP1. The second emission area EMA2 may be an area in which light is emitted from a portion of the light emitting structure EMS, which corresponds to the second sub-pixel SP2. The third emission area EMA3 may be an area in which light is emitted from a portion of the light emitting structure EMS, which corresponds to the third sub-pixel SP3. As described with reference to FIG. 11, each emission area may be understood as an opening OP of the pixel defining layer PDL, which corresponds to each of the first to third sub-pixels SP1 to SP3.

Figure 13:
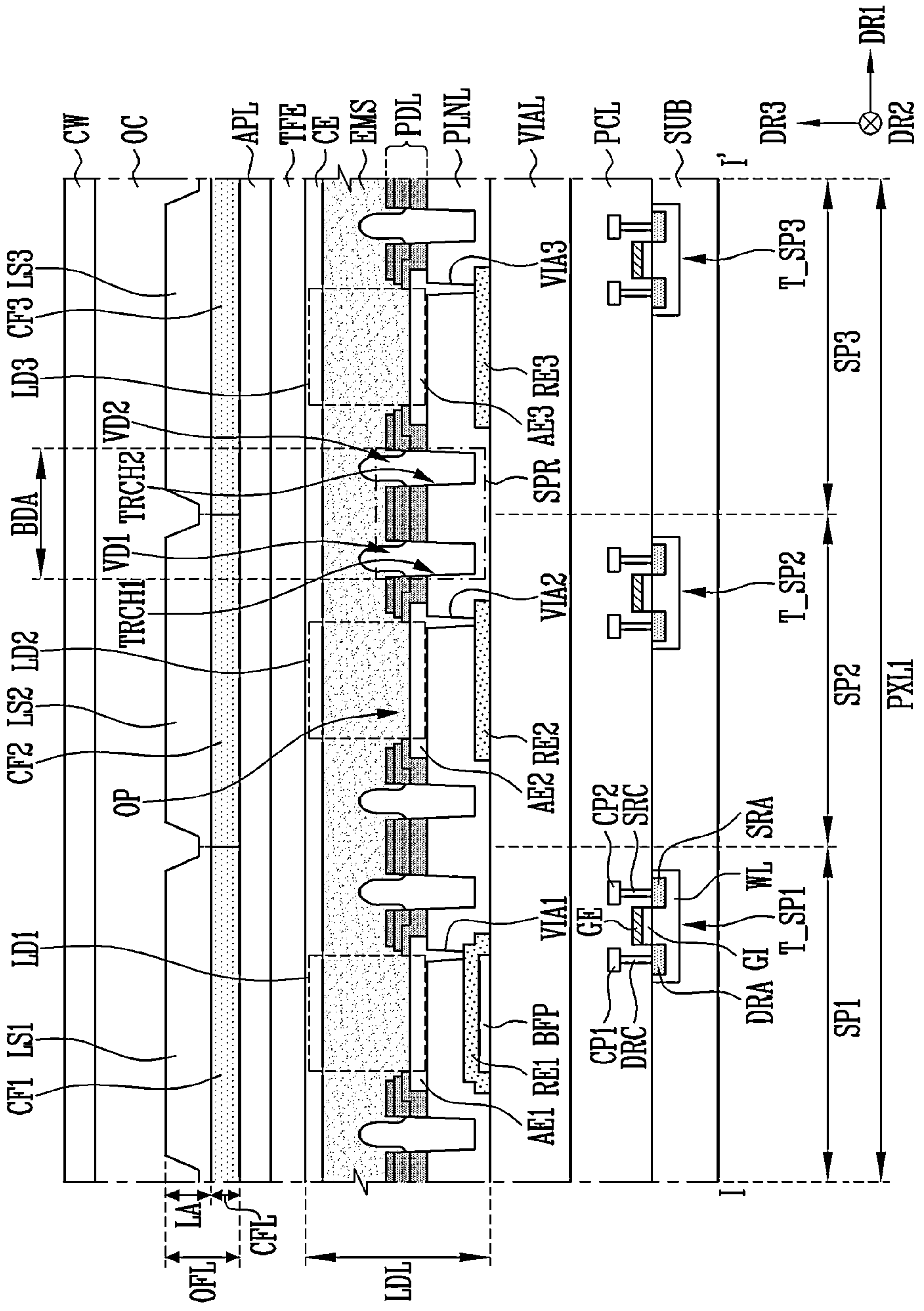
FIG. 13 is a sectional view illustrating an example of the pixel taken along line I-I' shown in FIG. 12.

FIG. 13 is a sectional view illustrating an example of the pixel taken along line I-I' shown in FIG. 12.

Referring to FIG. 13, a substrate SUB and a pixel circuit layer PCL disposed on the substrate SUB are provided.

The substrate SUB may include a silicon wafer substrate formed using a semiconductor process. For example, the substrate SUB may include silicon, germanium, or silicon-germanium.

The pixel circuit layer PCL may be disposed on the substrate SUB. The substrate SUB and the pixel circuit layer PCL may include at least some of circuit elements of each of first to third sub-pixels SP1 to SP3. For example, the substrate SUB and the pixel circuit layer PCL may include a transistor T_SP1 of the first sub-pixel SP1, a transistor T_SP2 of the second sub-pixel SP2, and a transistor T_SP3 of the third sub-pixel SP3. The transistor T_SP1 of the first sub-pixel SP1 may be any one of transistors included in a sub-pixel circuit SPC (see FIG. 2) of the first sub-pixel SP1. The transistor T_SP2 of the second sub-pixel SP2 may be any one of transistors included in a sub-pixel circuit SPC of the second sub-pixel SP2. The transistor T_SP3 of the third sub-pixel SP3 may be any one of transistors included in a sub-pixel circuit SPC of the third sub-pixel SP3. In FIG. 13, for clear and brief description, one of the transistors of each sub-pixel is illustrated, and the other circuit elements of the sub-pixel circuit SPC are not illustrated.

The transistors T_SP1 of the first sub-pixel SP1 may include a source region SRA, a drain region DRA, and a gate electrode GE.

The source region SRA and the drain region DRA may be disposed in the substrate SUB. A well WL formed through an ion implantation process may be disposed in the substrate SUB, and the source region SRA and the drain region DRA may be disposed in the well WL to be spaced apart from each other. A region between the source region SRA and the drain region DRA in the well WL may be defined as a channel region.

The gate electrode GE may be located while overlapping (e.g., overlapping in the third direction DR3) with the channel region between the source region SRA and the drain region DRA. The gate electrode GE may be included in the pixel circuit layer PCL. The gate electrode GE may be spaced apart from the well WL (or the channel region) by an insulating material (e.g., an insulating material such as a gate insulating layer GI). The gate electrode GE may include a conductive material.

A plurality of layers included in the pixel circuit layer PCL may include insulating layers and conductive patterns disposed between the insulating layers. The conductive patterns of the pixel circuit layer PCL may include first and second conductive patterns CP1 and CP2. The first conductive pattern CP1 may be connected (e.g., electrically connected) to the drain region DRA through a drain connection portion DRC penetrating one or more insulating layers. The second conductive pattern CP2 may be connected (e.g., electrically connected) to the source region SRA through a source connection portion SRC penetrating one or more insulating layers.

As the gate electrode GE, the first conductive pattern CP1, and the second conductive pattern CP2 are connected to other circuit elements or lines, the transistor T_SP1 of the first sub-pixel SP1 may be provided as any one of the transistors of the pixel circuit SPC (see FIG. 2).

Each of the transistor T_SP2 of the second sub-pixel SP2 and the transistor T_SP3 of the third sub-pixel SP3 may be configured identically to the transistor T_SP1 of the first sub-pixel SP1.

Similarly to as described above, the substrate SUB or the pixel circuit layer PCL may include circuit elements of each of the first to third sub-pixels SP1 to SP3.

A via layer VIAL may be disposed on the pixel circuit layer PCL. The via layer VIAL covers the pixel circuit layer PCL, and may have an entirely flat surface (e.g., a flat top surface). The via layer VIAL may be configured to planarize step differences on the pixel circuit layer PCL. The via layer VIAL may include at least one of silicon oxide ($SiO_x$), silicon nitride ($SiN_x$), and silicon carbon nitride (SiCN), but embodiments of the present disclosure are not limited thereto.

A light emitting element layer LDL may be disposed on the via layer VIAL. The light emitting element layer LDL may include first to third reflective electrodes RE1 to RE3, a planarization layer PLNL, first to third anode electrodes AE1 to AE3, a pixel defining layer PDL, a light emitting structure EMS, and a cathode electrode CE.

The first to third reflective electrodes RE1 to RE3 are respectively disposed in the first to third sub-pixels SP1 to SP3 on the via layer VIAL. Each of the first to third reflective electrodes RE1 to RE3 may be in contact with a circuit element disposed in the pixel circuit layer PCL through a via penetrating the via layer VIAL.

The first to third reflective electrodes RE1 to RE3 may serve as mirrors (e.g., full mirrors) which reflect light emitted from the light emitting structure EMS toward a display surface (or a cover window CW). The first to third reflective electrodes RE1 to RE3 may include a metal material suitable for reflecting light. The first to third reflective electrodes RE1 to RE3 may include at least one of aluminum (Al), silver (Ag), magnesium (Mg), platinum (Pt), palladium (Pd), gold (Au), nickel (Ni), neodymium (Nd), iridium (Ir), chromium (Cr), titanium (Ti), and alloys of two or more materials selected therefrom, but embodiments of the present disclosure are not limited thereto.

In embodiments, a buffer electrode may be disposed on the bottom of each of the first to third reflective electrodes RE1 to RE3. The buffer electrode may improve an electrical connection characteristic between a corresponding reflective electrode and a circuit element of the pixel circuit layer PCL. The buffer electrode may have a multi-layer structure. The multi-layer structure may include titanium (Ti), titanium nitride (TiN), tantalum nitride (TaN), and the like, but embodiments of the present disclosure are not limited thereto. In embodiments, a corresponding reflective electrode may be located between multiple layers of the buffer electrode.

At least one of the first to third reflective electrodes RE1 to RE3A may be disposed over a buffer pattern BFP. The buffer pattern BFP may be configured to control a position of the corresponding reflective electrode (e.g., a position of the reflective electrode in the third direction DR3). The buffer pattern BFP may include an inorganic material such as silicon carbon nitride, but embodiments of the present disclosure are not limited thereto. Referring to FIG. 13, as the buffer pattern BFP is disposed, the position of the corresponding reflective electrode (e.g., a height of the reflective electrode in the third direction DR3). Referring to FIG. 7, the buffer pattern BFP may be disposed between the first reflective electrode RE1 and the via layer VIAL, to adjust a height of the first reflective electrode RE1.

The first to third reflective electrodes RE1 to RE3 may serve as full mirrors, and the cathode electrode CE may serve as a half mirror. Light emitted from the light emitting structure EMS may be amplified by at least partially reciprocating between a corresponding reflective electrode and the cathode electrode CE. The above phenomenon may be understood as a resonance phenomenon. The amplified light may be output through the cathode electrode CE. A distance between each reflective electrode and the cathode electrode CE may be understood as a resonance distance of light emitted from the light emitting structure EMS. The resonance distance may be adjusted by the buffer pattern BFP.

Referring to FIG. 13, by the buffer pattern BFP, the first sub-pixel SP1 may have a resonance distance shorter than a resonance distance of another sub-pixel. Light in a specific wavelength band (e.g., a red color) may be effectively and efficiently amplified by the adjusted resonance distance.

Accordingly, the first sub-pixel SP1 can effectively and efficiently output light of the corresponding wavelength band.

Referring to FIG. 13, it is illustrated the buffer pattern BFP is provided to the first sub-pixel SP1 and is not provided to the second and third sub-pixels SP2 and SP3. However, embodiments of the present disclosure are not limited thereto. The buffer pattern may be provided even in at least one of the second and third sub-pixels SP2 and SP3, to adjust a resonance distance of the at least one of the second and third sub-pixels SP2 and SP3. For example, the first to third sub-pixels SP1 to SP3 may respectively correspond to red, green, and blue. A distance between the first reflective electrode RE1 and the cathode electrode CE may be shorter than a distance between the second reflective electrode RE2 and the cathode electrode CE. The distance between the second reflective electrode RE2 and the cathode electrode CE may be shorter than a distance between the third reflective electrode RE3 and the cathode electrode CE.

The planarization layer PLNL may be configured to planarize step differences between the first to third reflective electrodes RE1 to RE3. The planarization layer PLNL may be disposed on the via layer VIAL and the first to third reflective electrodes RE1 to RE3. The planarization layer PLNL entirely covers the first to third reflective electrodes RE1 to RE3 and the via layer VIAL. The planarization layer PLNL may have a flat surface (e.g., a top surface in the third direction DR3). In embodiments, the planarization layer PLNL may be omitted.

The first to third anode electrodes AE1 to AE3 may be disposed on the planarization layer PLNL. The first to third anode electrodes AE1 to AE3 may be overlap (e.g., overlap in the third direction DR3) with the first to third reflective electrodes RE1 to RE3, respectively. The first to third anode electrodes AE1 to AE3 may have shapes similar to the shapes of the first to third emission areas EMA1 to EMA3 shown in FIG. 6 when viewed in the third direction DR3. The first to third anode electrodes AE1 to AE3 may be connected to the first to third reflective electrodes RE1 to RE3, respectively. The first anode electrode AE1 may be connected (e.g., electrically connected) to the first reflective electrode RE1 through a first via VIA1 penetrating the planarization layer PLNL. The second anode electrode AE2 may be connected (e.g., electrically connected) to the second reflective electrode RE2 through a second via VIA2 penetrating the planarization layer PLNL. The third anode electrode AE3 may be connected (e.g., electrically connected) to the third reflective electrode RE3 through a third via VIA3 penetrating the planarization layer PLNL.

In embodiments, the first to third anode electrodes AE1 to AE3 may include at least one of transparent conductive materials such as indium tin oxide (ITO), indium zinc oxide (IZO), zinc oxide (ZnO), indium gallium zinc oxide (IGZO), and indium tin zinc oxide (ITZO). However, the material of the first to third anode electrodes AE1 to AE3 is not limited thereto. For example, the first to third anode electrodes AE1 to AE3 may include titanium nitride.

The pixel defining layer PDL may be disposed on portions of the first to third anode electrodes AE1 to AE3 and the planarization layer PLNL. The pixel defining layer PDL may include an opening OP exposing a portion of each of the first to third anode electrodes AE1 to AE3. The opening OP of the pixel defining layer PDL may define an emission area in which light is emitted from each of the first to third sub-pixels SP1 to SP3. The pixel defining layer PDL may be disposed in the non-emission area NEA shown in FIG. 12. The pixel defining layer PDL may define the first to third emission areas EMA1 to EMA3 shown in FIG. 12.

In embodiments, the pixel defining layer PDL may include a plurality of inorganic insulating layers. Each of the plurality of inorganic insulating layers may include at least one of silicon oxide ($SiO_x$) and silicon nitride ($SiN_x$). For example, the pixel defining layer PDL may include first to third inorganic insulating layers which are sequentially stacked, and each of the first to third inorganic insulating layers may include silicon nitride, silicon oxide, and silicon oxynitride. However, embodiments of the present disclosure are not limited thereto. The first to third inorganic insulating layers may have a step-shaped section in an area adjacent to the opening OP.

A separator SPR may be provided (or disposed) in a boundary area BDA between sub-pixels adjacent to each other. In other words, the separator SPR may be provided in each of boundary areas between the sub-pixels SP shown in FIG. 1.

The separator SPR may form a discontinuity in the light emitting structure in the boundary area BDA. For example, the light emitting structure EMS may be cut or bent by the separator SPR in the boundary area BDA.

The separator SPR may be provided in or on the pixel defining layer PDL. The pixel defining layer PDL may include one or more trenches TRCH1 and TRCH2 as the separator SPR. In embodiments, as shown in FIG. 13, the one or more trenches TRCH1 and TRCH2 may penetrate the pixel defining layer PDL, and partially penetrate at least a portion of the planarization layer PLNL. In other embodiments, the one or more trenches TRCH1 and TRCH2 may penetrate the pixel defining layer PDL and the planarization layer PLNL, and partially penetrate at least a portion of the via layer VIAL. In still other embodiments, the one or more trenches TRCH1 and TRCH2 may at least partially penetrate at least a portion of the planarization layer PLNL or at least a portion of the via layer VIAL, and at least a portion of the pixel defining layer PDL may be disposed in the one or more trenches TRCH1 and TRCH2.

Referring to FIG. 13, it is illustrated that a plurality of trenches TRCH1 and TRCH2 (e.g., a first trench TRCH1 and a second trench TRCH2) are provided (or disposed) in the boundary area BDA. However, embodiments of the present disclosure are not limited thereto. For example, the pixel defining layer PDL may include a singular (or one) trench in the boundary area BDA. For example, the pixel defining layer PDL may include three or more trenches in the boundary area BDA.

Due to the first and second trenches TRCH1 and TRCH2, a void as the discontinuity may be formed in the boundary area BDA. Referring to FIG. 13, discontinuities such as a first void VD1 and a second void VD2 may be formed (or disposed) in the light emitting structure EMS. Some of a plurality of layers stacked in the light emitting structure EMS may be cut or bent by the first and second voids VD1 and VD2. For example, at least one charge generation layer (CGL) included in the light emitting structure EMS may be cut by the first and second voids VD1 and VD2. Due to the first and second trenches TRCH1 and TRCH2, at least a portion of the light emitting structure EMS included in the first to third sub-pixels SP1 to SP3 may be partially separated.

Referring to FIG. 13, it is illustrated that the first and second voids VD1 and VD2 are formed in the light emitting structure EMS in the boundary area BDA. However, this is merely illustrative, and embodiments of the present disclosure are not limited thereto. For example, a concave-shaped valley may be formed in the light emitting structure EMS in the boundary area BDA. The discontinuities formed in the light emitting structure EMS may be variously changed according to shapes of the first and second trenches TRCH1 and TRCH2.

In embodiments, the light emitting structure EMS may be formed through a process such as vacuum deposition or inkjet printing. In the above embodiment, the light emitting structure EMS (or the same materials as the light emitting structure EMS) may be located on bottom surfaces adjacent to the via layer VIAL among the first and second trenches TRCH1 and TRCH2.

The separator SPR may be variously modified such that the light emitting structure EMS can have a discontinuity in the boundary area BDA. In embodiments, inorganic insulating patterns additionally stacked on the pixel defining layer PDL without the first and second trenches TRCH1 and TRCH2 may be provided in the boundary area BDA. A width of an inorganic insulating pattern at an uppermost portion among the additionally stacked inorganic insulating patterns may be greater than a width of an inorganic insulating pattern disposed immediately below the inorganic insulating pattern at the uppermost portion. For example, in an embodiment in which first to third inorganic insulating patterns are sequentially stacked from the pixel defining layer PDL in the boundary area BDA, a width of the third inorganic insulating pattern disposed at the uppermost portion may be greater than a width of the second inorganic insulating layer disposed immediately below the third inorganic insulating pattern. For example, the pixel defining layer PDL may have a section having a "T" shape or an "I" shape in the boundary area BDA. According to the pixel defining layer PDL having the "T" shape or the "I" shape, at least some of the plurality of layers included in the light emitting structure EMS may be partially cut or bent in the boundary area BDA.

The light emitting structure EMS may be disposed on the anode electrodes AE exposed by the openings OP of the pixel defining layer PDL. The light emitting structure EMS may fill the openings OP of the pixel defining layer PDL, and be entirely disposed throughout the first to third sub-pixels SP1 to SP3. As described above, at least a portion of the light emitting structure EMS may be partially cut or bent in the boundary area BDA by the separator SPR. Accordingly, in an operation of the display panel PD, the magnitude of current (e.g., leakage current) leaked from each of the first to third sub-pixels SP1 to SP3 to a sub-pixel adjacent thereto through the layers included in the light emitting structure EMS may be decreased (or removed). Thus, first to third light emitting elements LD1 to LD3 can operate with a relatively high reliability.

The cathode electrode CE may be disposed over the light emitting structure EMS. The cathode electrode CE may be commonly provided (or disposed) in the first to third sub-pixels SP1 to SP3. The cathode electrode CE may serve as a half mirror which allow light emitted from the light emitting structure EMS to be partially transmitted therethrough and to be partially reflected therefrom.

The first anode electrode AE1, a portion of the light emitting structure EMS, which overlaps with the first anode electrode AE1, and a portion of the cathode electrode CE, which overlaps with the first anode electrode AE1, may constitute the first light emitting element LD1. The second anode electrode AE2, a portion of the light emitting structure EMS, which overlaps with the second anode electrode AE2, and a portion of the cathode electrode CE, which overlaps with the second anode electrode AE2, may constitute the second light emitting element LD2. The third anode electrode AE3, a portion of the light emitting structure EMS, which overlaps with the third anode electrode AE3, and a portion of the cathode electrode CE, which overlaps with the third anode electrode AE3, may constitute the third light emitting element LD3.

A thin film encapsulation layer TFE may be disposed over the cathode electrode CE. The thin film encapsulation layer TFE may prevent oxygen or moisture from infiltrating into the light emitting element layer LDL.

An optical functional layer OFL may be disposed on the thin film encapsulation layer TFE. The optical functional layer OFL may include a color filter layer CFL and a lens array LA. In embodiments, the optical functional layer OFL may be attached to the thin film encapsulation layer TFE through an adhesive layer APL. For example, the optical functional layer OFL may be separately manufactured to be attached to the thin film encapsulation layer TFE through the adhesive layer APL. The adhesive layer APL may further perform a function of protecting lower layers including the thin film encapsulation layer TFE.

The color filter layer CFL may include first to third color filters CF1 to CF3 respectively corresponding to the first to third sub-pixels SP1 to SP3. The first to third color filters CF1 to CF3 may allow lights in different wavelength bands to pass therethrough. For example, the first to third color filters CF1 to CF3 may respectively allow lights of red, green, and blue colors to pass therethrough.

In embodiments, the first to third color filters CF1 to CF3 may partially overlap with each other in the boundary area BDA. In other embodiments, the first to third color filters CF1 to CF3 may be spaced apart from each other, and a black matrix may be provided (or disposed) between the first to third color filters CF1 to CF3.

The lens array LA may be disposed on the color filter layer CFL. The lens array LA may include first to third lenses LS1 to LS3 respectively corresponding to the first to third sub-pixels SP1 to SP3. The first to third lenses LS1 to LS3 may respectively output lights emitted from the first to third light emitting elements LD1 to LD3 along intended paths, thereby improving light emission efficiency.

An overcoat layer OC may be disposed over the lens array LA. The overcoat layer OC may include various materials suitable for protecting lower layers thereof from foreign matters such as dust and moisture. For example, the overcoat layer OC may include an inorganic insulating layer. For example, the overcoat layer OC may include epoxy resin, but embodiments of the present disclosure are not limited thereto. The overcoat layer OC may have a refractive index smaller than a refractive index of the lens array LA. The refractive index (e.g., an absolute refractive index) of the overcoat layer OC may be a first refractive index. The first refractive index may have, for example, a range of about 1.2 to about 1.4, but embodiments of the present disclosure are not limited thereto.

The cover window CW may be disposed on the overcoat layer OC. The cover window CW may have a refractive index greater than the refractive index of the overcoat layer OC. In some embodiments, the cover window CW may include glass, metal, and the like. However, embodiments of the present disclosure are not limited thereto. The cover window CW may be configured to protect components disposed on the bottom thereof. The refractive index (e.g., an absolute refractive index) of the cover window CW may be a second refractive index. The second refractive index may have, for example, a range of about 1.5 to about 1.9, but embodiments of the present disclosure are not limited thereto. The cover window CW may be designated as an encapsulation glass. The cover window CW may be in contact with the outside (e.g., air).

Figure 14:
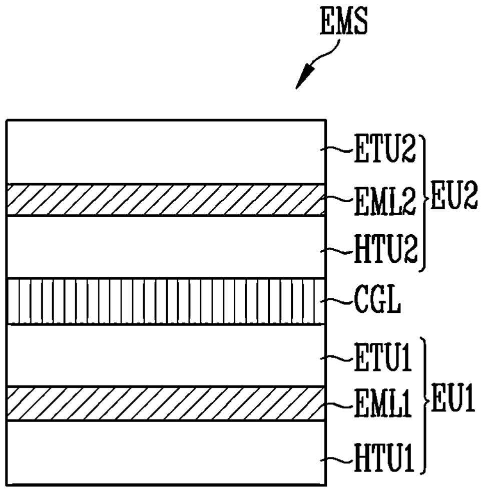
FIG. 14 is a sectional view illustrating an embodiment of a light emitting structure included in any one of first to third light emitting elements shown in FIG. 13.

FIG. 14 is a sectional view illustrating an embodiment of the light emitting structure EMS included in any one of the first to third light emitting elements LD1 to LD3 shown in FIG. 13.

Referring to FIG. 14, the light emitting structure EMS may have a tandem structure in which first and second light emitting units EU1 and EU2 are stacked. The light emitting structure EMS may be configured substantially identically in each of the first to third light emitting elements LD1 to LD3 shown in FIG. 13.

Each of the first and second light emitting units EU1 and EU2 may include at least one light emitting layer generating light according to an applied current. The first light emitting unit EU1 may include a first light emitting layer EML1, a first electron transport unit ETU1, and a first hole transport unit HTU1. The first light emitting layer EML1 may be disposed between the first electron transport unit ETU1 and the first hole transport unit HTU1. The second light emitting unit EU2 may include a second light emitting layer EML2, a second electron transport unit ETU2, and a second hole transport unit HTU2. The second light emitting layer EML2 may be disposed between the second electron transport unit ETU2 and the second hole transport unit HTU2.

Each of the first and second hole transport units HTU1 and HTU2 may include at least one of a hole injection layer and a hole transport layer. In some embodiments, each of the first and second hole transport units HTU1 and HTU2 may further include functional layers such as a hole buffer layer and an electron blocking layer. Each of the first and second hole transport units HTU1 and HTU2 may have the same configuration. In some embodiments, each of the first and second hole transport units HTU1 and HTU2 may have different configurations.

Each of the first and second electron transport units ETU1 and ETU2 may include at least one of an electron injection layer and an electron transport layer. In some embodiments, each of the first and second electron transport units ETU1 and ETU2 may further include functional layers such as an electron buffer layer and a hole blocking layer. Each of the first and second electron transport units ETU1 and ETU2 may have the same configuration. In some embodiments, each of the first and second electron transport units ETU1 and ETU2 may have different configurations.

A connection layer may connect between the first light emitting unit EU1 and the second light emitting unit EU2. The connection layer may be provided, for example, in the form of a charge generation layer CGL. In embodiments, the charge generation layer CGL may have a stacked structure of a p-dopant layer and an n-dopant layer. For example, the p-dopant layer may include a p-type dopant such as HAT-CN, TCNQ or NDP-9. For example, the n-dopant layer may include an alkali metal, an alkali earth metal, a lanthanide-based metal, or any combination thereof. However, embodiments of the present disclosure are not limited thereto.

In embodiments, the first light emitting layer EML1 and the second light emitting layer EML2 may generate lights of different colors (or different wavelength bands). Lights respectively emitted from the first light emitting layer EML1 and the second light emitting layer EML2 may be mixed together, to be viewed as white light by a user. For example, the first light emitting layer EML1 may generate light of a blue color, and the second light emitting layer EML2 may generate light of a yellow color. In embodiments, the second light emitting layer EML2 may include a structure in which a first sub-light emitting layer (not shown) configured to generate light of a red color and a second sub-light emitting layer (not shown) configured to generate light of a green color are stacked. The light of the red color and the light of the green color may be mixed together to provide the light of the yellow color. An intermediate layer configured to perform a function of transporting holes or a function of blocking transportation of electrodes may be further disposed between the first and second sub-light emitting layers.

In other embodiments, the first light emitting layer EML1 and the second light emitting layer EML2 may generate light of the same color.

The light emitting structure EMS may be formed through a process such as vacuum deposition or inkjet printing, but embodiments of the present disclosure are not limited thereto.

Figure 15:
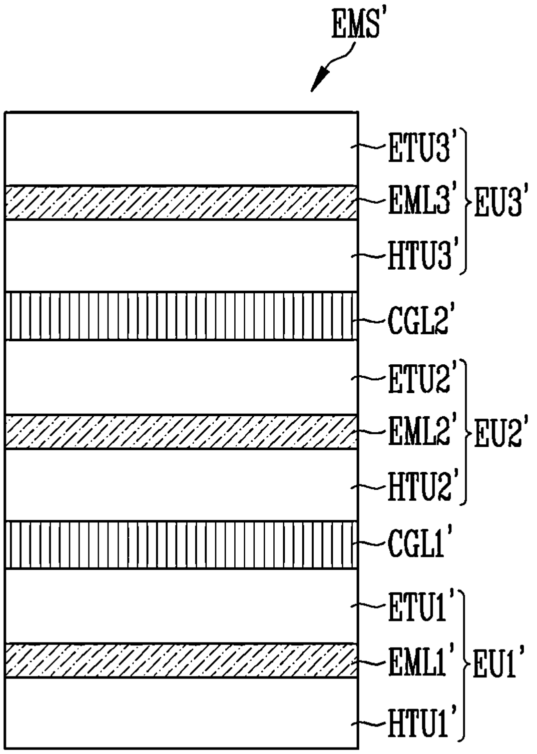
FIG. 15 is a sectional view illustrating another embodiment of the light emitting structure included in the one of the first to third light emitting elements shown in FIG. 13.

FIG. 15 is a sectional view illustrating another embodiment EMS' of the light emitting structure included in the one of the first to third light emitting elements LD1 to LD3 shown in FIG. 13.

Referring to FIG. 15, a light emitting structure EMS' may a tandem structure in which first to third light emitting units EU1' to EU3' are stacked. The light emitting structure EMS' may be configured substantially identically in each of the first to third light emitting elements LD1 to LD3 shown in FIG. 13.

Each of the first to third light emitting units EU1' to EU3' may include a light emitting layer generating light according to an applied current. The first light emitting unit EU1' may include a first light emitting layer EML1', a first electron transport unit ETU1' and a first hole transport unit HTU1'. The first light emitting layer EML1' may be disposed between the first electron transport unit ETU1' and the first hole transport unit HTU1'. The second light emitting unit EU2' may include a second light emitting layer EML2', a second electron transport unit ETU2', and a second hole transport unit HTU2'. The second light emitting layer EML2' may be disposed between the second electron transport unit ETU2' and the second hole transport unit HTU2'. The third light emitting unit EU3' may include a third light emitting layer EML3', a third electron transport unit ETU3', and a third hole transport unit HTU3'. The third light emitting layer EML3' may be disposed between the third electron transport unit ETU3' and the third hole transport unit HTU3'.

Each of the first to third hole transport units HTU1' to HTU3' may include at least one of a hole injection layer and a hole transport layer. In some embodiments, each of the first to third hole transport units HTU1' to HTU3' may further include at least one of a hole buffer layer and an electron blocking layer. In some embodiments, the first to third hole transport units HTU1' to HTU3' may have the same configuration. Alternatively the first to third hole transport units HTU1' to HTU3' may have different configurations.

Each of the first to third electron transport units ETU1' to ETU3' may include at least one of an electron injection layer and an electron transport layer. In some embodiments, each of the first to third electron transport units ETU1' to ETU3' may further include at least one of an electron buffer layer and a hole blocking layer. The first to third electron transport units ETU1' to ETU3' may have the same configuration. Alternatively, the first to third electron transport units ETU1' to ETU3' may have different configurations.

A first charge generation layer CGL1' may be disposed between the first light emitting unit EU1' and the second light emitting unit EU2'. A second charge generation layer CGL2' may be disposed between the second light emitting unit EU2' and the third light emitting unit EU3'.

In embodiments, the first to third light emitting layers EML1' to EML3' may generate lights of different colors. Lights respectively emitted from the first to third light emitting layers EML1' to EML3' may be mixed together, to be viewed as white light by a user. For example, the first light emitting layer EML1' may generate light in a first wavelength band (e.g., a blue color), the second light emitting layer EML2' may generate light in a second wavelength band (e.g., a green color), and the third light emitting layer EML3' may generate light in a third wavelength band (e.g., a red color).

In other embodiments, light emitting layers of at least two of the first to third light emitting layers EML1' to EML3' may generate light in the same wavelength band (or the same color).

Unlike as shown in FIGS. 14 and 15, the light emitting structure EMS shown in FIG. 13 may include one light emitting unit EU in each of the first to third light emitting elements LD1 to LD3. In the above embodiment, the light emitting unit EU included in each of the first to third light emitting elements LD1 to LD3 may be configured to emit lights in different wavelength bands (or different colors). Further referring to FIG. 13, the light emitting unit EU of the first light emitting element LD1 may emit light in a first wavelength band (e.g., a red color), the light emitting unit EU of the second light emitting element LD2 may emit light in a second wavelength band (e.g., a green color), and the light emitting unit EU of the third light emitting element LD3 may emit light in a third wavelength band (e.g., a blue color). In the above embodiment, unlike as shown in FIG. 13, light emitting structures EMS of the first to third sub-pixels SP1*a* to SP3*a* may be separated from each other. Each of the light emitting structures EMS may be disposed in the opening OP of the pixel defining layer PDL. In the above embodiment, at least some of the color filters CF1 to CF3 may be omitted.

Figure 16:
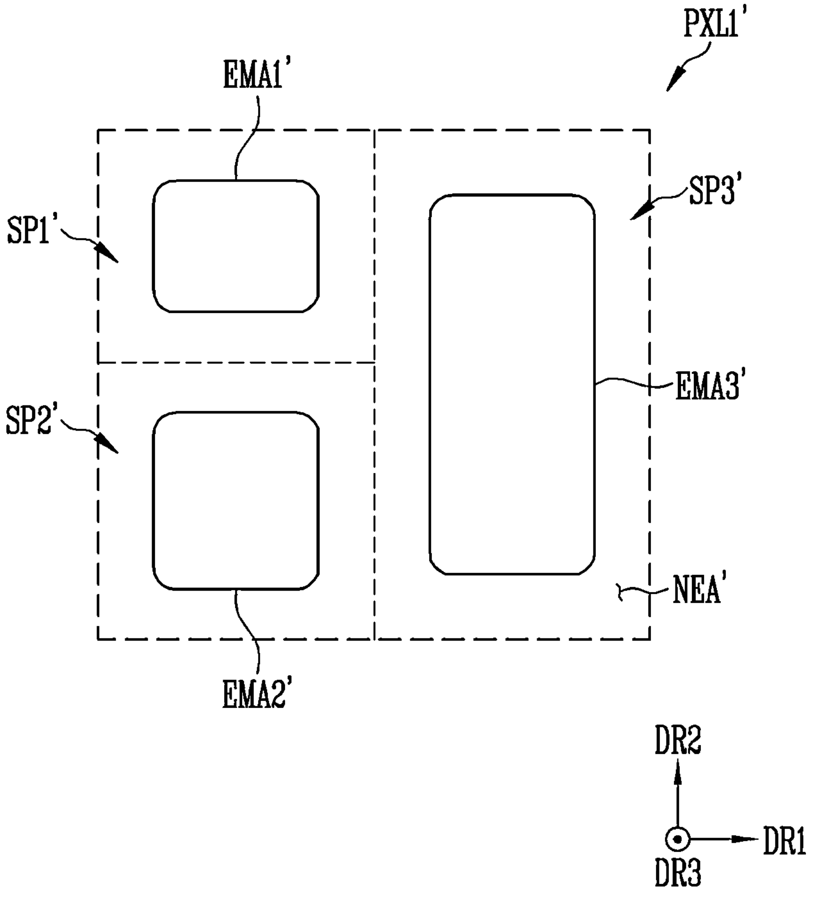
FIG. 16 is a plan view illustrating another embodiment of any one of pixels shown in FIG. 5.

FIG. 16 is a plan view illustrating another embodiment of any one of the pixels PXL shown in FIG. 5.

Referring to FIG. 16, a first pixel PXL1' may include first to third sub-pixels SP1' to SP3'.

The first sub-pixel SP1' may include a first emission area EMA1' and a non-emission area NEA' at the periphery of the first emission area EMA1'. The second sub-pixel SP2' may include a second emission area EMA2' and the non-emission area NEA' at the periphery of the second emission area EMA2'. The third sub-pixel SP3' may include a third emission area EMA3' and the non-emission area NEA' at the periphery of the third emission area EMA3'.

The first sub-pixel SP1' and the second sub-pixel SP2' may be arranged in the second direction DR2 (or adjacent to each other in the second direction DR2). The third sub-pixel SP3' may be disposed in the first direction DR1 (or adjacent in the first direction DR1) with respect to each of the first and second sub-pixels SP1' and SP2'.

An area of the second sub-pixel SP2' may be greater than an area of the first sub-pixel SP1'. An area of the third sub-pixel SP3' may be greater than the area of the second sub-pixel SP2'. An area of the second emission area EMA2' as an emission area of the second sub-pixel SP2' may be greater than an area of the first emission area EMA1' as an emission area of the first sub-pixel SP1'. An area of the third emission area EMA3' as an emission area of the third sub-pixel SP3' may be greater than the area of the second emission area EMA2' as the emission area of the second sub-pixel SP2'. However, embodiments of the present disclosure are not limited thereto. For example, the areas of the first and second sub-pixels SP1' and SP2' may be the same (or substantially same), and the area of the third sub-pixel SP3' may be greater than the area of each of the first and second sub-pixels SP1' and SP2'. As described above, the area of each of the first to third sub-pixels SP1' to SP3' may be variously modified in some embodiments.

Figure 17:
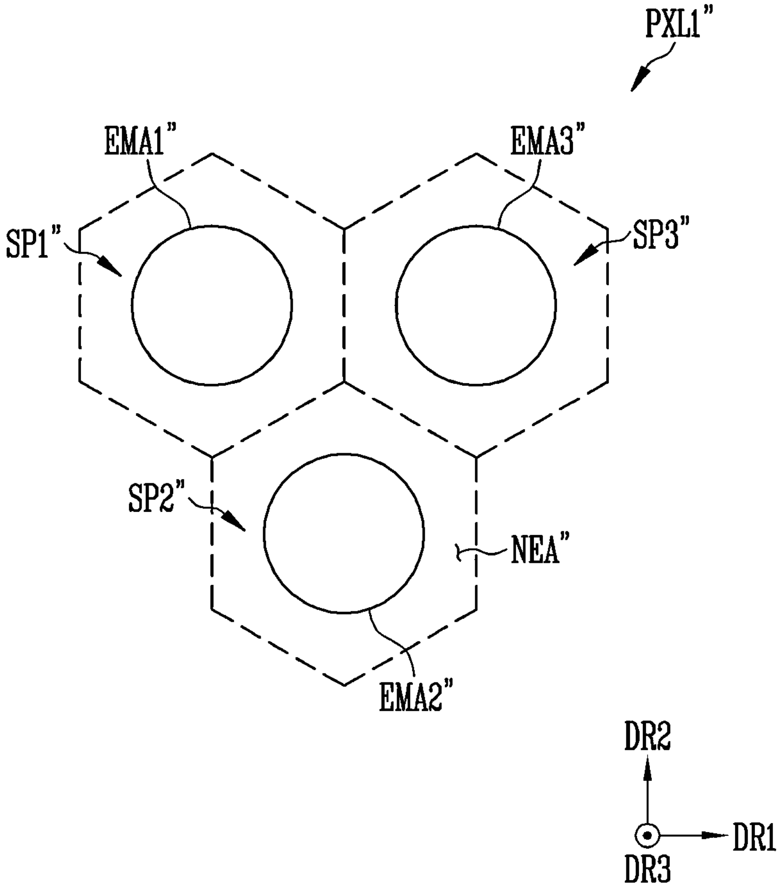
FIG. 17 is a plan view illustrating still another embodiment of the one of the pixels shown in FIG. 5.

FIG. 17 is a plan view illustrating still another embodiment of the one of the pixels PXL shown in FIG. 5.

Referring to FIG. 17, a first sub-pixel SP1" may include a first emission area EMA1" and a non-emission area NEA" at the periphery of the first emission area EMA1". A second sub-pixel SP2" may include a second emission area EMA2" and the non-emission area NEA" at the periphery of the second emission area EMA2". A third sub-pixel SP3" may include a third emission area EMA3" and the non-emission area NEA" at the periphery of the third emission area EMA3".

The first to third sub-pixels SP1" to SP3" may have polygonal shapes when viewed in one direction (e.g., the third direction DR3). For example, the shape of each of the first to third sub-pixels SP1" to SP3" may be a hexagonal shape as shown in FIG. 17.

Each of the first to third emission areas EMA1" to EMA3" may have a circular shape when viewed in one direction (e.g., the third direction DR3). However, embodiments of the present disclosure are not limited thereto. For example, each of the first to third emission areas EMA1" to EMA3" may have a polygonal shape.

The first and third sub-pixels SP1" and SP3" may be arranged in the first direction DR1 (or adjacent to each other in the first direction DR1). The second sub-pixel SP2" may be disposed in a direction (or diagonal direction) inclined by an acute angle, based on the second direction DR2, with respect to the first sub-pixel SP1".

The arrangements of the sub-pixels SP, which are shown in FIGS. 12, 16, and 17, are merely illustrative, and embodiments of the present disclosure are not limited thereto. Each pixel PXL may include two or more sub-pixels SP, and the sub-pixels SP in the pixel PXL may be arranged in various manners. Each of the sub-pixels SP may have various shapes, and an emission area EMA of the sub-pixel SP may have various shapes.

Figure 18:
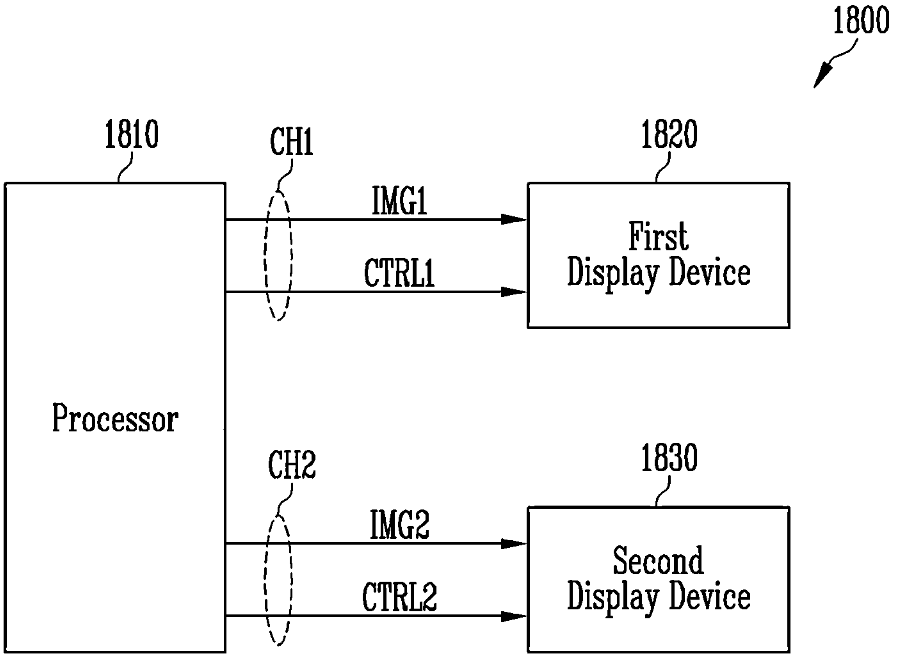
FIG. 18 is a block diagram illustrating an embodiment of a display system in accordance with embodiments of the present disclosure.

FIG. 18 is a diagram illustrating an embodiment of a display system 1800 in accordance with embodiments of the present disclosure.

Referring to FIG. 18, a display system 1800 may include a processor 1810 and one or more display devices 1820 and 1830.

The processor 1810 may perform various tasks and various calculations. In embodiments, the processor 1810 may include an Application Processor (AP), a Graphics Processing Unit (GPU), a microprocessor, a Central Processing Unit (CPU), and the like. The processor 1810 may be connected to other components of the display system 1800 through a bus system to control the components of the display system 1800.

In FIG. 18, it is illustrated that the display system 1800 includes first and second display devices 1820 and 1830. The processor 1810 may be connected to the first display device 1820 through a first channel CH1, and be connected to the second display device 1830 through a second channel CH2.

Through the first channel CH1, the processor 1810 may transmit first image data IMG1 and a first control signal CTRL1 to the first display device 1820. The first display device 1820 may display an image, based on the first image data IMG1 and the first control signal CTRL1. The first display device 1820 may be configured identically to the display device 100 described with reference to FIG. 1. The first image data IMG1 and the first control signal CTRL1 may be respectively provided as the input image data IMG and the control signal CTRL, which are shown in FIG. 1.

Through the second channel CH2, the processor 1810 may transmit second image data IMG2 and a second control signal CTRL2 to the second display device 1830. The second display device 1830 may display an image, based on the second image data IMG2 and the second control signal CTRL2. The second display device 1830 may be configured identically to the display device 100 described with reference to FIG. 1. The second image data IMG2 and the second control signal CTRL2 may be respectively provided as the image data IMG and the control signal CTRL, which are shown in FIG. 1.

The display system 1800 may include a computing system for providing an image display function, such as a portable computer, a mobile phone, a smartphone, a tablet personal computer (PC), a smart watch, a watch phone, a portable multimedia player (PMP), a navigation system, or an ultra-mobile computer (UMPC). Also, the display system 1800 may include at least one of a head-mounted display (HMD) device, a virtual reality (VR) device, a mixed reality (MR) device, and an augmented reality (AR) device.

Figure 19:
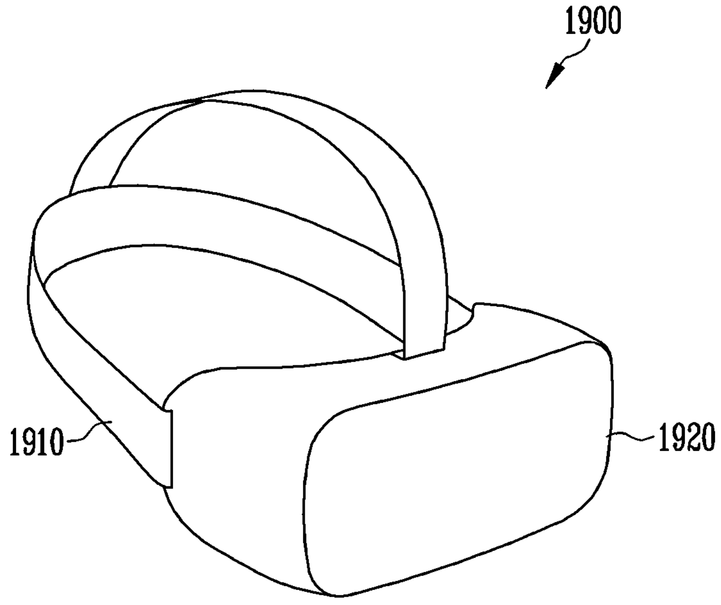
FIG. 19 is a perspective view illustrating an embodiment of the display system shown in FIG. 18.

FIG. 19 is a perspective view illustrating an application example of the display system 1800 shown in FIG. 18.

Referring to FIG. 19, the display system 1800 shown in FIG. 18 may be applied to a head-mounted display device 1900. The head-mounted display device 1900 may be a wearable electronic device which can be worn on a head of a user.

The head-mounted display device 1900 may include a head mounting band 1910 and a display device accommodating case 1920. The head mounting band 1910 may be connected to the display device accommodating case 1920. The head mounting band 1910 may include a horizontal band or a vertical band, used to fix the head-mounted display device 1900 to the head of the user. The horizontal band may be configured to surround a side portion of the head of the user, and the vertical band may be configured to surround an upper portion of the head of the user. However, embodiments of the present disclosure are not limited thereto. For example, the head mounting band 1910 may be implemented in the form of a glasses frame, a helmet or the like.

The display device accommodating case 1920 may accommodate the first and second display devices 1820 and 1830 shown in FIG. 18. The display device accommodating case 1920 may further accommodate the processor 1810 shown in FIG. 18.

Figure 20:
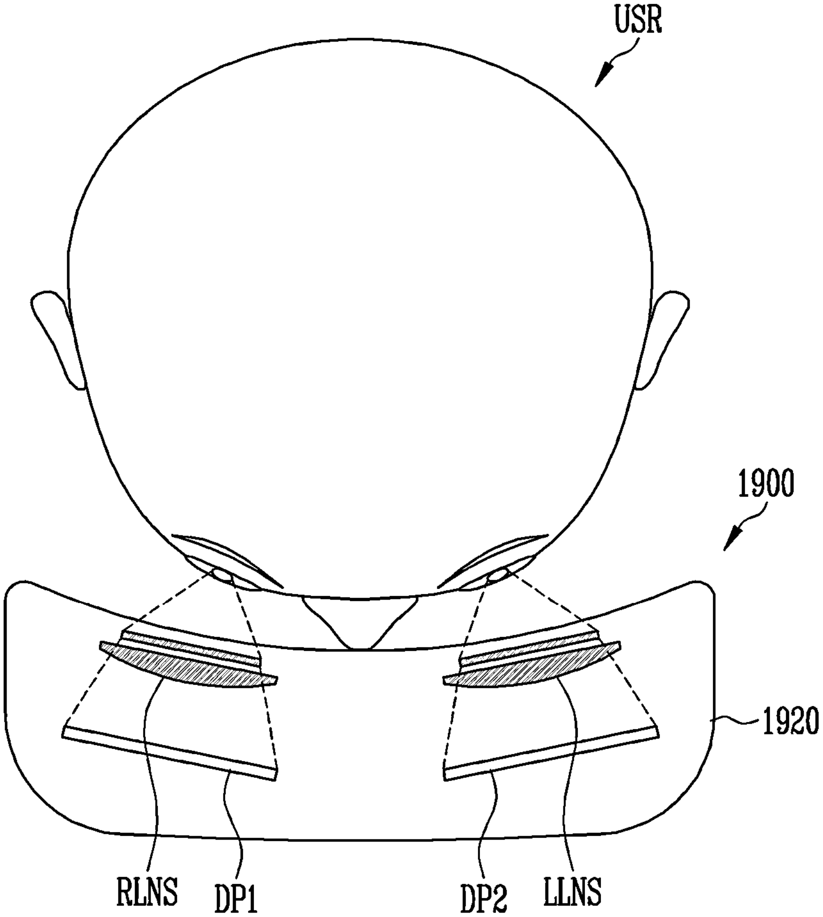
FIG. 20 is a view illustrating an embodiment of a head-mounted display device worn by a user.

FIG. 20 is a view illustrating the head-mounted display device 1900 worn by a user.

Referring to FIG. 20, a first display panel DP1 of the first display device 1820 (see FIG. 18) and a second display panel DP2 of the second display device 1830 (see FIG. 18) may be disposed in the head-mounted display device 1900. The head-mounted display device 1900 may further include one or more lenses. For example, the head-mounted display device 1900 may include a left-eye lens LLNS and a right-eye lens RLNS.

In the display device accommodating case 1920, the right-eye lens RLNS may be disposed between the first display panel DP1 and a right eye (or one eye) of a user USR. In the display device accommodating case 1920, the left-eye lens LLNS may be disposed between the second display panel DP2 and a left eye (or the other eye) of the user USR.

An image output from the first display panel DP1 may be viewed by the right eye of the user USR through the right-eye lens RLNS. The right-eye lens RLNS may refract light emitted from the first display panel DP1 to face the right eye of the user USR. The right-eye lens RLNS may perform an optical function for adjusting a viewing distance between the first display panel DP1 and the right eye of the user USR.

An image output from the second display panel DP2 may be viewed by the left eye of the user USR through the left-eye lens LLNS. The left-eye lens LLNS may refract light emitted from the second display panel DP2 to face the left eye of the user USR. The left-eye lens LLNS may perform an optical function for adjusting a viewing distance between the second display panel DP2 and the left eye of the user USR.

In embodiments, each of the right-eye lens RLNS and the left-eye lens LLNS may include an optical lens having a pancake-shaped section. In embodiments, each of the right-eye lens RLNS and the left-eye lens LLNS may include a multi-channel lens including sub-areas having different optical characteristics. In the above embodiment, each of the first and second display panels DP1 and DP2 may output images respectively corresponding to the sub-areas of the multi-channel lens, and the output images may be viewed by the user while respectively passing through corresponding sub-areas.

When heat generation occurs in any one of the first display panel DP1 and the second display panel DP2, an image obtained by synthesizing a background image BIMG (see FIG. 4 or the like) may be displayed on only any one of the first display panel DP1 and the second display panel DP2. The user USR may recognize that the heat generation exists in the first display panel DP1 from that the background image BIMG is synthesized with an image displayed on the right eye. Alternatively, the user USR may recognize that the heat generation exists in the second display panel DP2 from that the background image BIMG is synthesized with an image displayed on the left eye.

In the display device, the driving method thereof, and the head-mounted display device in accordance with the present disclosure, a user can visually recognize heat generation even when connection between the temperature sensor and the controller is deteriorated.

According to a temperature of the first display device and the second display device, an image obtained by synthesizing the background image may be displayed in any one of the first display device and the second display device, and an image obtained by not synthesizing the background image may be displayed in the other of the first display device and the second display device.

While the present disclosure has been described with reference to embodiments thereof, it will be apparent to those of ordinary skill in the art that various changes and modifications may be made thereto without departing from the scope and spirit of the present disclosure as set forth in the following claims.

What is claimed is:

1. A display device comprising:

a display panel including a display area and a non-display area at the periphery of the display area, wherein a plurality of data lines and a plurality of pixels connected to the plurality of data lines are disposed in the display area;

a temperature sensors disposed in the non-display area of the display panel, the temperature sensor configured to output temperature data corresponding to a sensed temperature, wherein a plurality of temperature sensors including the temperature sensor are disposed in the non-display area of the display panel, and wherein at least one of the plurality of temperature sensors is disposed in each area of the non-display area corresponding to each corner in a plurality of corner areas in the display area; and a data driver configured to convert the temperature data into digital-type temperature data, synthesize a background image, based on the digital-type temperature data, and convert synthesized image data obtained by synthesizing the background image into a data voltage, thereby outputting the data voltage to the plurality of data lines wherein the background image is displayed in a corner area decided to be at a high temperature and the image data is displayed in a corner decided to be in normal range.

2. The display device of claim 1, wherein the data driver is connected to a panel line disposed in the non-display area of the display panel, and wherein the temperature sensor outputs the temperature data through the panel line.

3. The display device of claim 1, wherein the data driver includes:

an analog-digital converter configured to convert the temperature data into the digital-type temperature data;

a memory configured to store the digital-type temperature data;

a temperature image generator configured to store the background image therein, and generate synthesized image data obtained by synthesizing the background image with received image data, based on a result obtained by reading the digital-type temperature data stored in the memory; and an output circuit configured to convert the synthesized image data into a data voltage, thereby outputting the data voltage to the plurality of data lines.

4. The display device of claim 3, further comprising a controller configured to receive the digital-type temperature data and input image data, generate the image data by correcting the input image data, based on the digital-type temperature data, and output the image data and a data control signal.

5. The display device of claim 4, wherein the data driver further includes:

a first interface configured to receive the data control signal, and output the digital-type temperature data; and a second interface configured to receive the image data.

6. The display device of claim 5, wherein the first interface is an Inter-Integrated Circuit (I2C) interface, and the second interface is a Low Voltage Differential Signaling (LVDS) interface.

7. The display device of claim 1, wherein the analog-digital converter sequentially senses the plurality of temperature sensors.

8. The display device of claim 7, wherein a plurality of digital-type temperature data generated by sequentially sensing the plurality of temperature sensors are stored in the memory.

9. The display device of claim 8, wherein the temperature image generator generates the synthesized image data by synthesizing the background image with the image data such that the background image is displayed in an area decided to be at a high temperature, based on the plurality of digital-type temperature data.

10. The display device of claim 1, wherein the background image is displayed in at least one of the plurality of corner areas of the display area.

11. The display device of claim 1, wherein the background image is displayed in an edge area in which two adjacent corner area among the plurality of corner area of the display area are connected to each other.

12. The display device of claim 3, wherein the temperature image generator differently gradation-processes the background image, based on a value of the digital-type temperature data.

13. A method of driving a display device, the method comprising:

receiving temperature data from a plurality of temperature sensors disposed in a non-display area of a display panel wherein at least one of the plurality of temperature sensors is disposed in each area of the non-display area corresponding to each corner in a plurality of corner areas in the display area;

converting the received temperature data into digital-type temperature data;

storing the converted digital-type temperature data in a memory;

reading the digital-type temperature data stored in the memory;

synthesizing a pre-stored background image with input image data, based on the read digital-type temperature data;

converting synthesized image data obtained by synthesizing the background image with the image data into a data voltage corresponding thereto; and outputting the data voltage to a display area of the display panel wherein the background image is displayed in a corner area decided to be at a high temperature and the image data is displayed in a corner decided to be in normal range.

14. A head-mounted display device comprising:

a processor configured to output first input image data and second input image data;

a first display device including a first display panel, the first display device configured to synthesize a stored background image with first image data corresponding to the first input image data, based on temperature data sensed in the first display panel, thereby displaying a first synthesized image to a first eye of a user, wherein the first display device includes:

a plurality temperature sensors disposed in the non-display area of the first display panel, the plurality of temperature sensors being configured to output the temperature data corresponding to a sensed temperature, wherein at least one of the plurality of temperature sensors is disposed in each area of the non-display area corresponding to each corner in a plurality of corner areas in the display area, wherein the background image is displayed in a corner area decided to be at a high temperature and the image data is displayed in a corner decided to be in normal range; and a second display device including a second display panel, the second display device configured to synthesize a stored background image with second image data corresponding to the second input image data, based on temperature data sensed in the second display panel, thereby displaying a second synthesized image to a second eye of the user.

15. The head-mounted display device of claim 14, wherein the first display panel includes a display area and a non-display area at the periphery of the display area, and a plurality of data lines and a plurality of pixels connected to the plurality of data lines are disposed in the display area, and a data driver configured to convert the temperature data into digital-type temperature data, synthesize a background image, based on the digital-type temperature data, and convert synthesized image data obtained by synthesizing the background image into a data voltage, thereby outputting the data voltage to the plurality of data lines.

16. The head-mounted display device of claim 15, wherein the data driver includes:

an analog-digital converter configured to convert the temperature data into the digital-type temperature data;

a memory configured to store the digital-type temperature data;

a temperature image generator configured to store the background image therein, and generate synthesized image data obtained by synthesizing the background image with the received first image data, based on a result obtained by reading the digital-type temperature data stored in the memory; and an output circuit configured to convert the synthesized image data into a data voltage, thereby outputting the data voltage to the plurality of data lines.

17. The head-mounted display device of claim 16, wherein the first display device further includes a controller configured to receive the digital-type temperature data and the first input image data, generate the first image data by correcting the first input image data, based on the digital-type temperature data, and output the first image data and a data control signal.

18. The head-mounted display device of claim 17, wherein the data driver further includes:

a first interface configured to receive the data control signal, and output the digital-type temperature data; and a second interface configured to receive the first image data.

19. The head-mounted display device of claim 14, wherein, according to a temperature of the first display device and the second display device, an image obtained by synthesizing the background image is displayed in any one of the first display device and the second display device, and an image obtained by not synthesizing the background image is displayed in the other of the first display device and the second display device.

* * * * *